(12) United States Patent
Miller

(10) Patent No.: US 7,447,404 B2
(45) Date of Patent: Nov. 4, 2008

(54) PHOTONIC INTEGRATED CIRCUIT

(75) Inventor: Robert O. Miller, Rochester, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 20 days.

(21) Appl. No.: 11/337,927

(22) Filed: Jan. 24, 2006

(65) Prior Publication Data

US 2006/0159411 A1    Jul. 20, 2006

Related U.S. Application Data

(63) Continuation-in-part of application No. 11/124,736, filed on May 9, 2005, now abandoned, and a continuation-in-part of application No. 10/855,482, filed on May 27, 2004, now Pat. No. 7,065,274.

(51) Int. Cl.
  *G02B 6/12* (2006.01)
  *G02B 6/26* (2006.01)
  *G02B 6/42* (2006.01)
  *G02B 6/00* (2006.01)

(52) U.S. Cl. .......................... 385/43; 385/14; 385/15; 385/31; 385/39; 385/50; 385/52; 385/134; 385/136; 385/137

(58) Field of Classification Search .................. 385/43, 385/14, 15, 31, 39, 50, 52, 134, 136, 137
See application file for complete search history.

(56) References Cited

U.S. PATENT DOCUMENTS

| | | | | |
|---|---|---|---|---|
| 5,168,538 | A * | 12/1992 | Gillespie | 385/123 |
| 2002/0159126 | A1* | 10/2002 | Sigalas et al. | 359/245 |
| 2002/0167984 | A1* | 11/2002 | Scherer | 372/50 |
| 2003/0133661 | A1* | 7/2003 | Adibi et al. | 385/43 |
| 2004/0184735 | A1* | 9/2004 | Noda et al. | 385/39 |
| 2005/0191774 | A1* | 9/2005 | Li et al. | 438/22 |
| 2005/0259999 | A1* | 11/2005 | Covey | 398/188 |

* cited by examiner

*Primary Examiner*—Frank G Font
*Assistant Examiner*—Jerry Blevins
(74) *Attorney, Agent, or Firm*—Frederick A. Kriege

(57) ABSTRACT

An optical platform including optical bench, an optical or photonic coupling device and a photonic circuit. The photonic circuit includes a photonic crystal along a waveguide and/or defect. The coupling device may be a waveguide or impedance matching interconnection device. The optical bench includes a rectangular trench to seat an optical fiber and provide alignment with the photonic circuit.

29 Claims, 18 Drawing Sheets

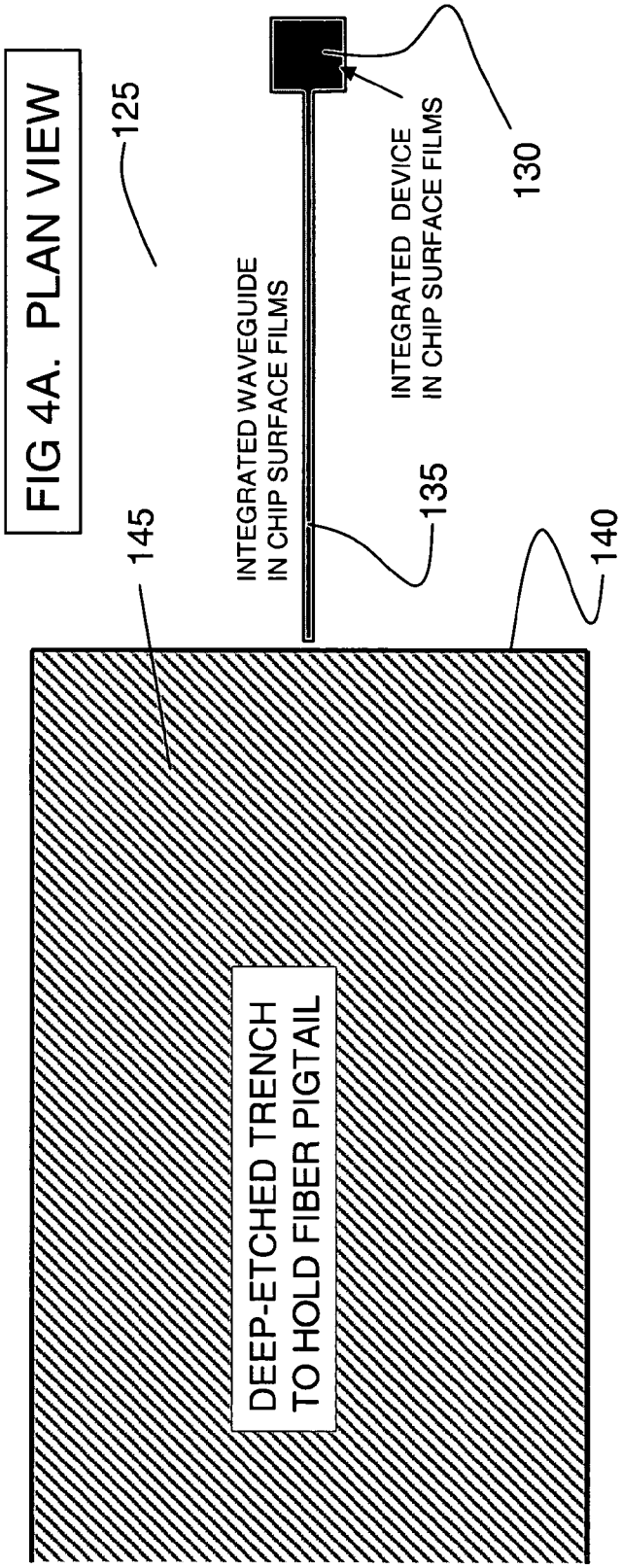
FIG 4A. PLAN VIEW
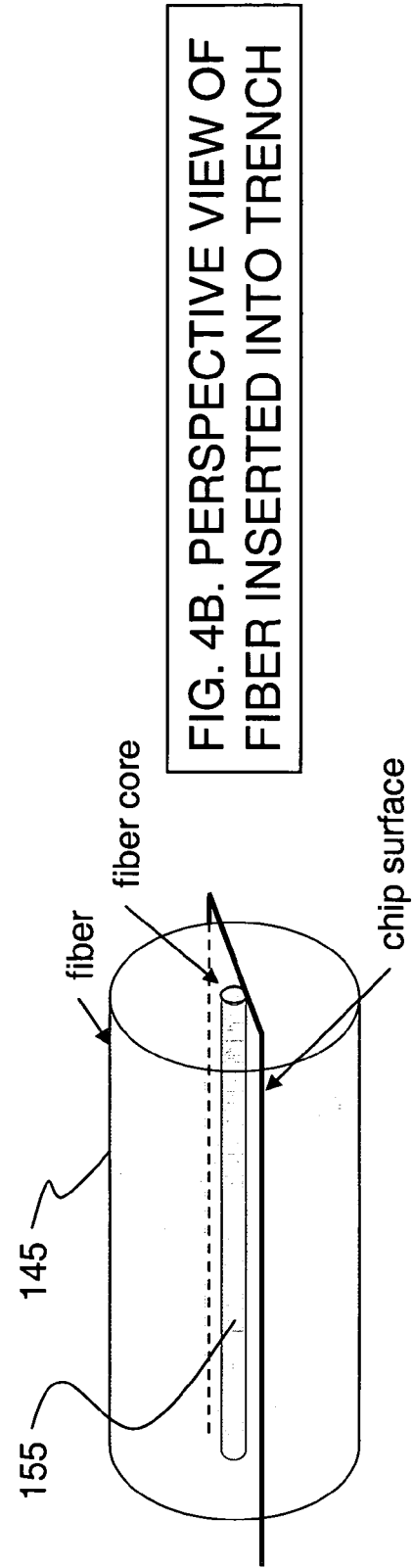
FIG. 4B. PERSPECTIVE VIEW OF FIBER INSERTED INTO TRENCH

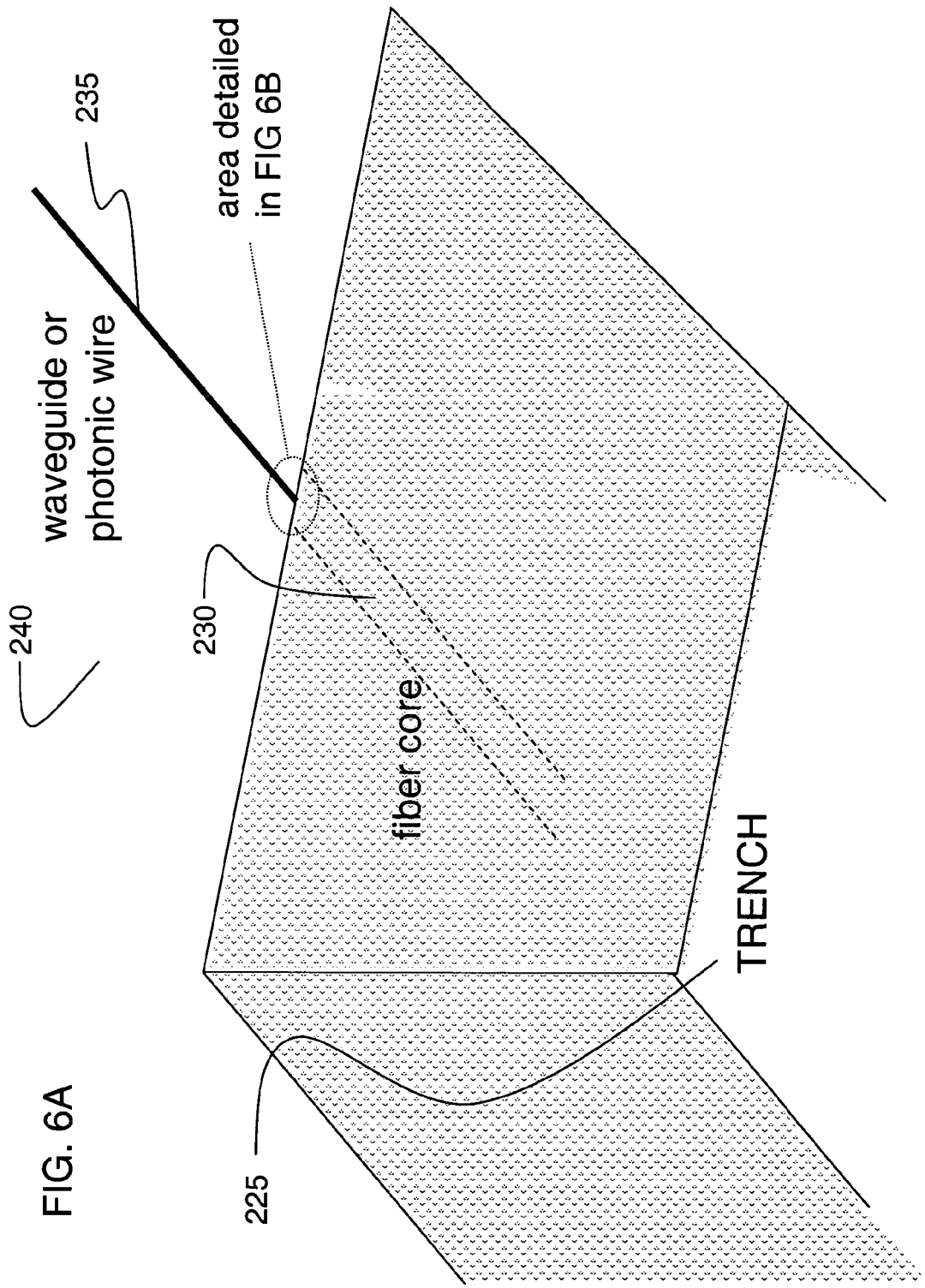

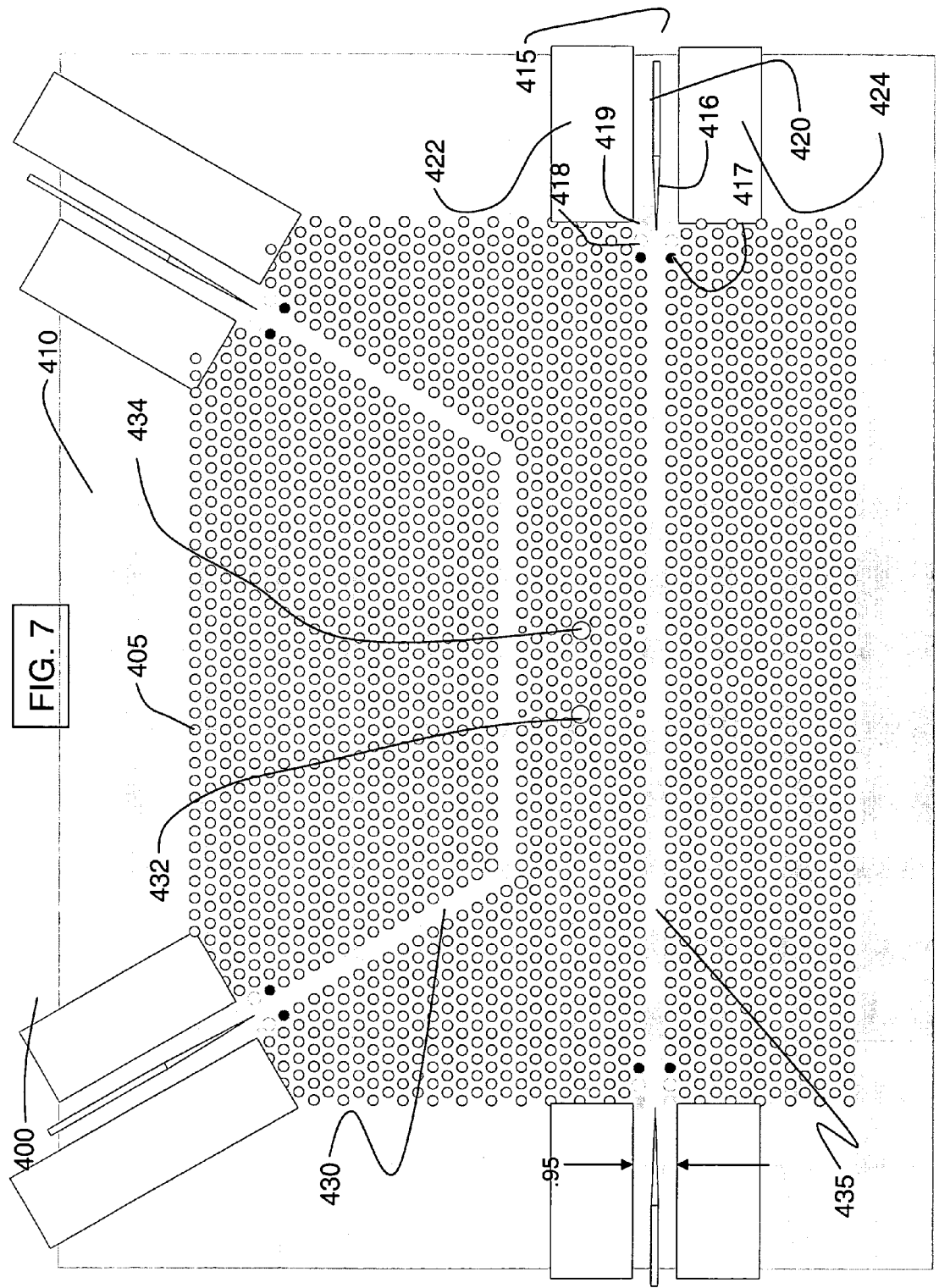

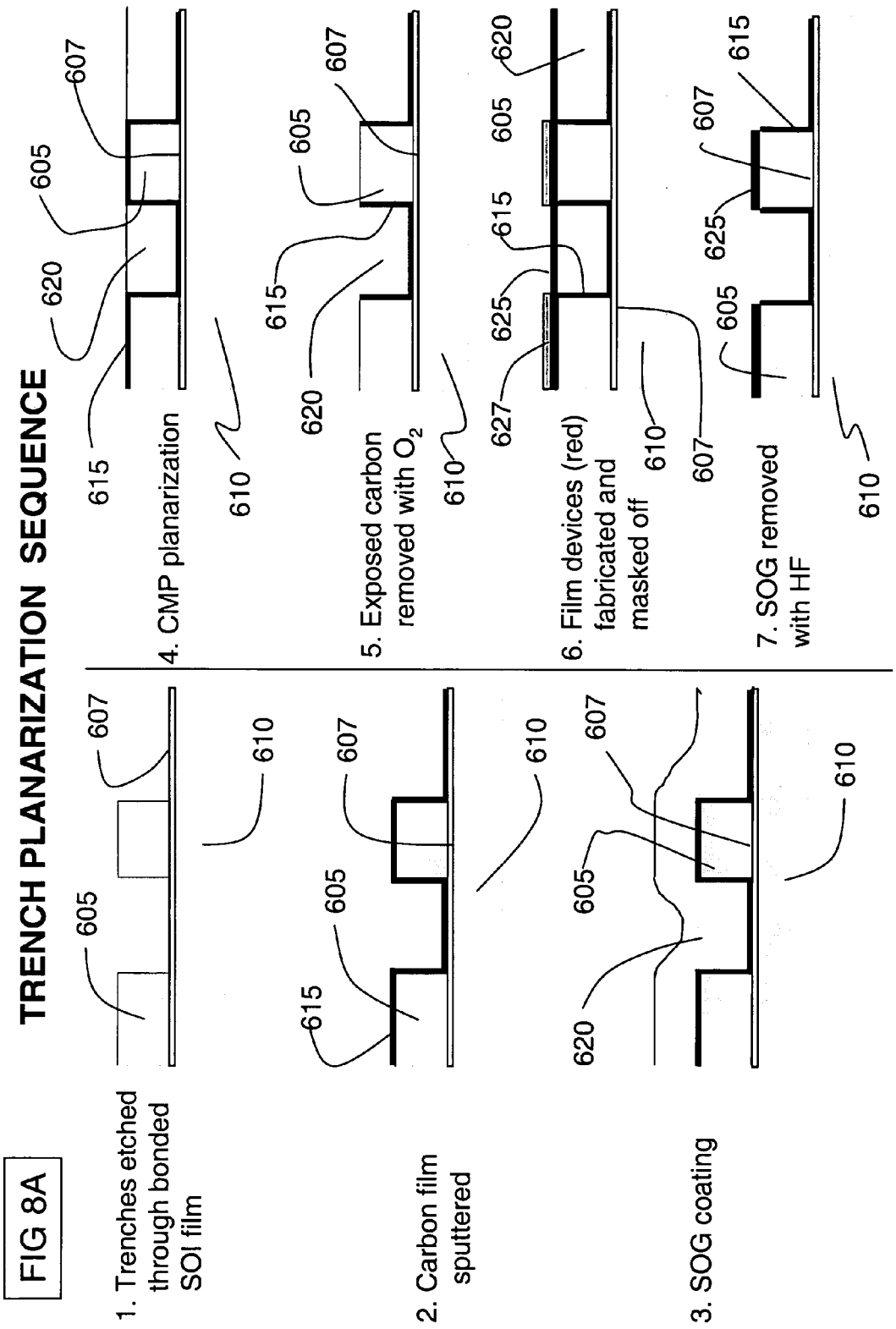

FABRICATION SEQUENCE, PASSIVE PHOTONIC CRYSTAL

FIG 8B

1. Deposit $SiO_2$, 1000 nm and a-$Ge_3Si$, 225 nm

— Ge₃Si film (644)
   — SiO₂ cladding (642)
   — substrate (640)

2. E-beam pattern and RIE etch holes through GeSi film. Holes ~ 225 nm dia. in regular triangular array, period ~ 375 nm. (Diameter and spacing vary locally where defects are intended.)

— 644, 646, 640

3. Deposit $SiO_2$, 1000 nm

— 644, SiO₂ cladding, 648, 642, 640

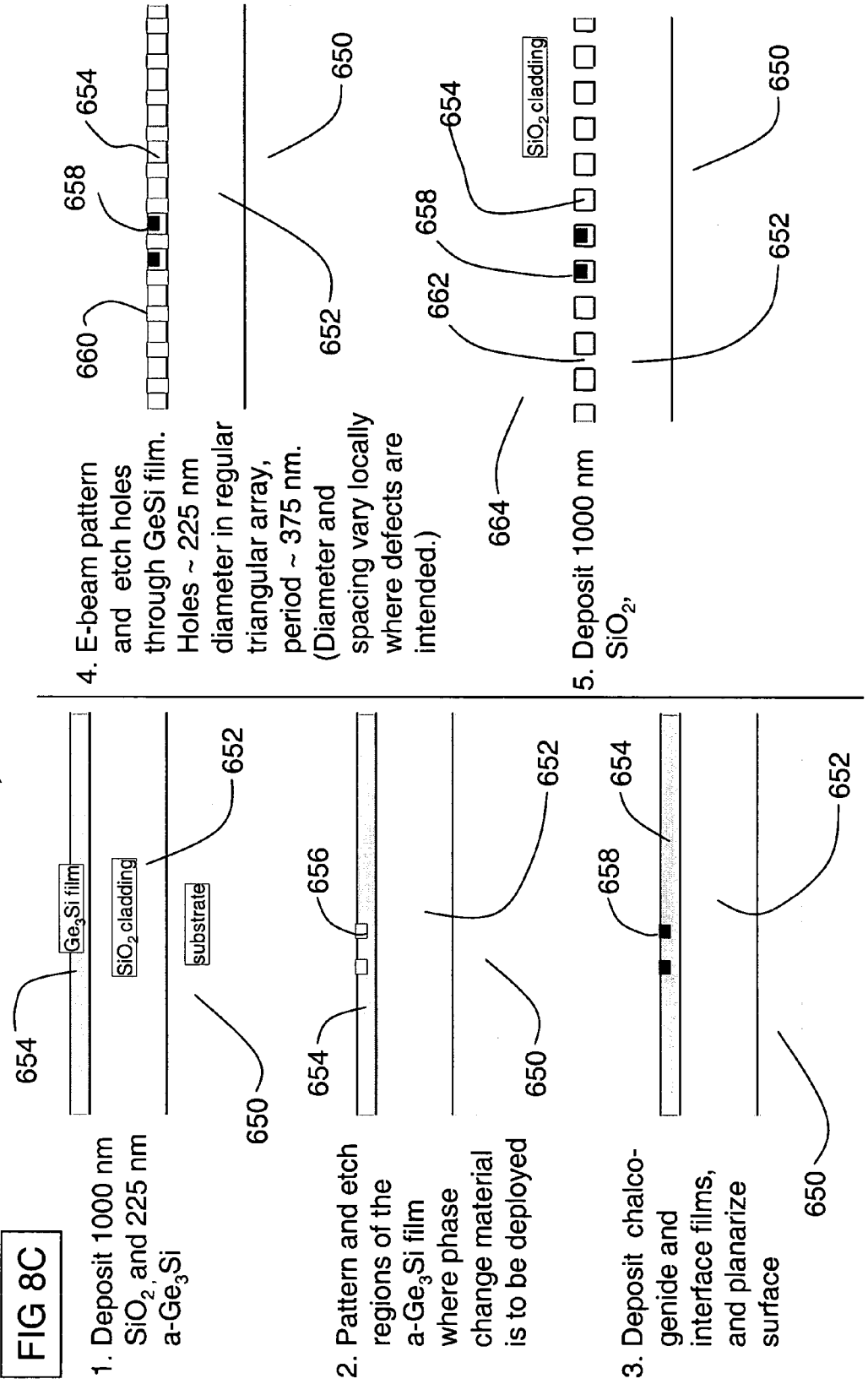

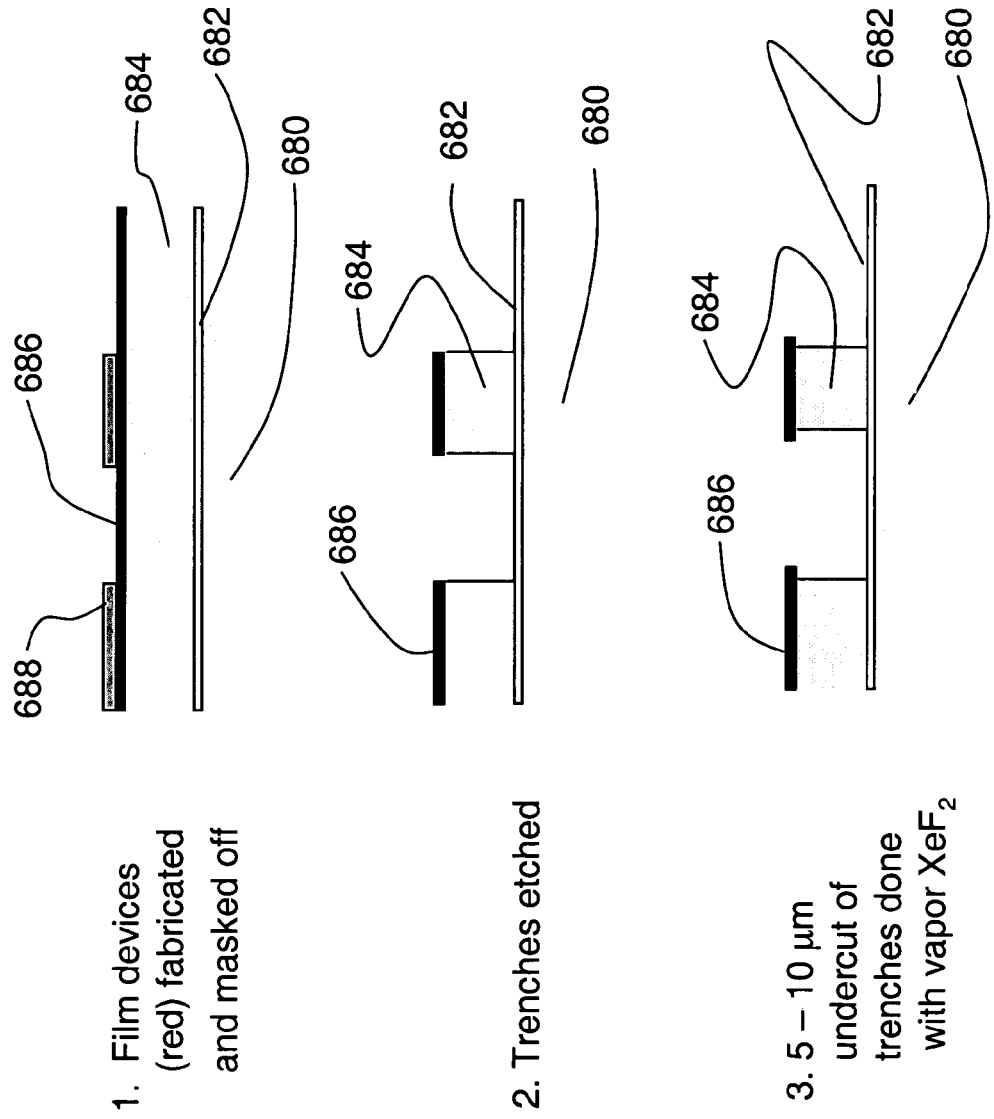

PHOTONIC INTEGRATED CIRCUIT

CROSS-REFERENCE TO RELATED APPLICATIONS

This application is a continuation in part of U.S. patent application Ser. No. 10/855,482, entitled "Optical Coupling Device" and filed on May 27, 2004 now U.S. Pat. No. 7,065,274, and a continuation in part of U.S. patent application Ser. No. 11/124,736, entitled "Photonic Coupling Device" and filed on May 9, 2005; the disclosures of which is hereby incorporated by reference herein.

FIELD OF INVENTION

This invention relates to integrated optical elements for the transmission and direction of light in an optical circuit. More specifically, this invention relates to a platform that includes a photonic circuit and an optical bench that permits the efficient coupling of optical fibers to photonic devices such as photonic crystals and waveguides. Most specifically, this invention relates to an optical bench that includes a trench region to accommodate an optical fiber in such way that optimal alignment and index matching occurs with the photonic circuit to provide improved signal transfer efficiency.

BACKGROUND OF THE INVENTION

Photonic crystals are one of the most significant recent advances in the field of optical devices and optical signal processing. A photonic crystal possesses a photonic band gap that defines a range of electromagnetic frequencies that are unable to propagate in the crystal. Photonic crystals include periodically-arranged regions of one dielectric material within a surrounding dielectric material. The precise details and dimensionality of the periodic arrangement, along with the refractive index contrast between the periodically arranged regions and the surrounding material, dictate the characteristics of the photonic band gap of a photonic crystal. Important material design considerations include the size, spacing and arrangement of the periodically-arranged dielectric regions within a volume of surrounding material as well as the refractive indices of the periodically-arranged dielectric regions and the surrounding material. The periodicity of the periodically-arranged dielectric media can extend in one, two or three dimensions. These considerations influence the magnitude of the photonic band gap, the frequency range of light or other electromagnetic energy (e.g. infrared, microwave etc.) that falls within the photonic band gap and whether the photonic band gap is full (in which case the photonic band gap effect is manifested regardless of the direction of propagation of the incident light) or partial (in which case the photonic band gap effect is manifested for some, but not all, directions of propagation).

Light having an energy within the photonic band gap and propagating in a direction defined by the photonic band gap is blocked and unable to propagate in a photonic crystal. When external light having an energy and direction of propagation within the photonic band gap is made incident to a photonic crystal, it is unable to propagate through the crystal. Instead, it is perfectly reflected. Light with an energy or direction of propagation outside of the photonic band gap, on the other hand, passes through a photonic crystal.

Effects analogous to doping or defects in semiconductors may also be realized in photonic crystals to further control the interaction of photonic crystals with light. The periodicity of photonic crystals can be perturbed in ways analogous to the introduction of dopants and defects in semiconductors. The periodicity of a photonic crystal is a consequence of a regular and ordered arrangement of macroscopic dielectric regions or media (e.g. rods or holes) within a surrounding medium (e.g. dielectric slab). Effects that interrupt the arrangement of macroscopic dielectric media can be used to break the periodicity to create photonic states within the photonic band gap. Possible ways of perturbing an array of rods in a surrounding dielectric slab, for example, include varying the size, position, optical constants, chemical composition of one or more rods or forming rods from two or more materials. The ability to create photonic states within the photonic band gap provides further flexibility in controlling the frequencies and directions of incident light that are reflected, redirected, localized or otherwise influenced by a photonic crystal.

By introducing defects into photonic crystals, it is possible to control the direction of propagation of light and to confine light. The introduction, for example, of a linear defect in a quasi-two-dimensional photonic crystal confines light and permits use of the photonic crystal as a waveguide for wavelengths within the photonic band gap of the crystal. Point defects can be used to localize light and to form resonant cavities. Examples of photonic crystals and the effect of defects in photonic crystals on the properties of propagating light can be found in the publications: "Linear waveguides in photonic-crystal slabs" by S. G. Johnson et al. and published in Physical Review B, vol. 62, p. 8212-8222 (2000); "Photonic Crystals: Semiconductors of Light" by E. Yablonovich and published in Scientific American, p. 47-55, December issue (2001); *Photonic Crystals: Molding the Flow of Light*; by J. D. Joannopoulos et al., Princeton University Press (1995); and "Channel drop filters in photonic crystals" by S. Fan et al. and published in Optics Express, vol. 3, p. 4-11 (1998).

It is widely expected that photonic crystals will be significant components in the next-generation information, optical and communication systems. Many people believe that the potential ability to control the propagation of light offered by photonic crystals may exceed the ability of semiconductors to control the propagation of electrons and that a commensurately greater economic benefit will result from the development of new technologies and industries based on photonic crystals and their ability to selectively inhibit, direct or localize the propagation of light in increasingly complex ways. The technological areas in which photonic crystals are projected to make an impact continue to grow in scope. Projected applications include Leeds and lasers that emit light in very narrow wavelength ranges or that are of baroscopic dimensions, direction selective reflectors, narrow wavelength optical filters, micro cavities for channeling light, color pigments, high capacity optical fibers, integrated photonic and electronic circuits that combine photonic crystals and semiconductors to produce new functionality, devices for light confinement, optical switches, modulators, and miniature waveguides.

In order to realize the potential for photonic crystals in integrated optical systems, it is necessary to devise ways to efficiently couple light into photonic crystals. Efficient coupling from conventional fibers and waveguides to photonic crystals and vice versa is one desired objective. In the case of photonic crystals having defects, it is further desirable to develop a capability for the direct coupling of light from a waveguide or other interconnect into the defect. Another important objective is the efficient coupling of light from one photonic crystal to another and from a photonic wire (or other waveguide) to a photonic crystal (and vice versa).

U.S. patent application Ser. No. 10/855,482 ('482 application) filed by the instant assignee describes a low loss method for the coupling of light from an optical fiber to a slab waveguide. The '482 application provides devices and a general framework for achieving improved coupling efficiency between elements of an optical circuit that differ in physical size or cross-section and/or refractive index. Improved coupling efficiency is achieved through a coupling device that maintains or approximately maintains the impedance encountered by a propagating optical signal as the geometric cross-section and/or refractive index in the direction of propagation varies over a finite distance. The '482 application recognizes that impedance variations that occur along the direction of propagation lead to losses in the transmission of an optical signal and presents devices in which competing geometric and constitutive influences on impedance can be balanced to minimize variations in impedance so that transmission efficiency can be improved.

U.S. patent application Ser. No. 11/124,736 ('736 application) filed by the instant assignee extends the impedance matching concept presented in the '482 application to photonic crystals and waveguides. The '736 application specifically provides for the efficient coupling of an optical signal to or from a photonic wire waveguide to a photonic crystal waveguide or defect. By tailoring the shape of a photonic wire waveguide in a way that conforms to changes in refractive index as the signal enters a photonic crystal or waveguide, it becomes possible to maintain constant or approximately constant impedance and to minimize losses upon transfer of the signal from the photonic wire waveguide to a photonic crystal waveguide or defect.

U.S. Pat. No. 6,859,304 ('304 patent) granted to the instant assignee describes a photonic crystal and channel drop filter that comprises a switchable chalcogenide component. The chalcogenide material can be reversibly transformed into a plurality of structural states that possess distinct optical constants. When included in a defect in a photonic crystal, the chalcogenide material provides for tunable functionality due to the ability to reversibly vary its refractive index and absorption coefficient through control of its structural state. In the case of a photonic crystal resonator, the cavity can be made absorptive or non-absorptive through proper selection of the structural state of the chalcogenide. This feature can be exploited, for example, to produce a channel drop filter that can be switched on or off at will to control the routing of light in photonic crystals and optical integrated circuits in general.

The '482 application, the '736 application and the '304 patent provide devices and methods for minimizing losses during the transfer of an optical signal between photonic crystals, cavities and other defects of photonic crystals, photonic wire waveguides, slab waveguides, and channel drop filters and provide effective strategies for optimizing the efficiency of the routing and processing of optical signals at the device level in photonic integrated circuits. To further advance the field of photonic integrated circuits, it is desirable to develop systems and processing methods that simplify the integration of conventional fibers and waveguides with photonic crystals, waveguides, and planar structures in general.

An important objective is the realization of photonic integrated circuits through economically feasible manufacturing methods such as planar fabrication processes. A key objective is the fabrication of planar photonic integrated circuit elements that can be readily and efficiently interconnected to conventional optical fibers. Optical fibers represent the wiring of all-optical networks and are the medium of choice for transmitting optical signals over long distances. In order to improve the commercial viability of photonic integrated circuits, it is desirable develop optical platforms that include planar photonic devices (active or passive) and are readily joined with conventional fibers. Key issues include alignment of the fiber core with a planar waveguide or planar photonic crystal and minimization of transfer losses at the junction between the optical fiber and planar structure.

SUMMARY OF THE INVENTION

The instant invention provides a photonic platform for integrated optical circuits that includes a photonic circuit and a surrounding optical bench that allows for integration of the photonic circuit with an optical fiber. The photonic circuit includes an interconnected assembly of active and/or passive photonic devices which may include one or more of the following: a photonic crystal (with or without a resonator cavity or other defect), a photonic wire, a photonic waveguide, or slab waveguide. The photonic devices may be active or passive devices. In a preferred embodiment, the photonic devices are planar devices.

In one embodiment, the optical bench includes a trench adjacent to the photonic devices which may be used to seat an optical fiber. In this embodiment, a trench is formed in the optical bench and an optical fiber is placed therein and laterally positioned to a point in close proximity to the receiving element of the photonic circuit. In preferred embodiment, the trench is lithographically aligned with the receiving element of the photonic circuit. In another preferred embodiment the trench is rectangular in shape. In still another preferred embodiment, the optical fiber is adhesively affixed within the trench.

In other embodiments, the optical bench includes an undercut region located beneath a portion of the photonic circuit. The undercut region is formed by etching or otherwise removing a portion of the substrate or other supporting material upon which the photonic circuit is formed. In a preferred embodiment, the undercut region is contiguous with the trench formed in the optical bench and extends beneath the end of the photonic circuit in closest proximity to the optical fiber. Upon formation of an undercut region, the undercut portion of the photonic circuit protrudes into the trench and is surrounded by a medium that has a lower refractive index than the substrate or supporting material removed during the undercut process. In one embodiment, the surrounding medium is air and the undercut portion of the photonic circuit lacks mechanical support in the vertical direction. By surrounding the undercut portion of the photonic circuit with a low refractive index medium, the confinement of an optical signal within the photonic crystal is improved and losses of the optical signal to the substrate or other higher refractive index supporting layers is reduced. As a result, the transfer efficiency from an optical fiber to the photonic circuit is improved.

In another embodiment, the instant photonic platform includes an impedance matching photonic coupling device that facilitates the transfer from an optical fiber to the photonic circuit. The photonic coupling device is positioned between the optical fiber and the photonic circuit and enables high transfer efficiency by maintaining a constant or approximately constant optical impedance along the direction of propagation of the optical signal.

BRIEF DESCRIPTION OF THE DRAWINGS

FIG. 4A. Plan view depiction of rectangular trench for holding an optical fiber and showing an interconnection to a photonic circuit.

FIG. 4B. Perspective view of fiber placement in a rectangular trench.

FIG. 6A. Junction region of an embodiment of the instant optical platform.

FIG. 7. Embodiment of a photonic circuit including a channel drop filter, four ports, a cavity resonator, photonic crystal and waveguides.

FIG. 8A. Schematic depiction of trench formation fabrication process.

FIG. 8B. Schematic depiction of photonic crystal formation fabrication process.

FIG. 8C. Schematic depiction of photonic crystal including periodically arranged regions comprised of a plurality of materials.

FIG. 8D. Schematic depiction of trench-last fabrication process for forming an undercut region.

DETAILED DESCRIPTION OF THE ILLUSTRATED EMBODIMENTS

The realization of all-optical information networks requires the development of novel active and passive photonic devices, interconnection of those devices to form photonic circuits, and integration of photonic circuits with optical fibers. Envisioned optical networks include local nodes and a capacity to transfer optical signals to and from the local nodes. In most designs, optical fibers are the preferred medium for transmitting optical signals between nodes. The processing of optical signals typically occurs at the node level, where functions such as multiplexing, demultiplexing, steering, wavelength separation, and wavelength conversion occur. In order to achieve more sophisticated processing of optical signals, it is necessary to improve the level of control over the wavelength, direction of propagation, intensity, and mode characteristics of individual optical signals and to combine and separate multiple optical signals to provide multichannel capability and high throughput capacity.

A key factor in the success of all-optical networks is an efficient transfer of optical signals from optical fibers to the nodes that they connect. This transfer is challenging because optical fibers have relatively large diameters, while many of the optical devices at the local node level that process optical signals are small scale devices with fine feature sizes. Furthermore, optical fibers typically have a round cross-sectional area, while many of the preferred optical devices for processing optical signals have planar structures with rectangular cross-sections. The resulting feature size and cross-sectional geometry mismatch complicates the problem of transferring light from an optical fiber to the optical devices used to process optical signals.

Figure 1A:
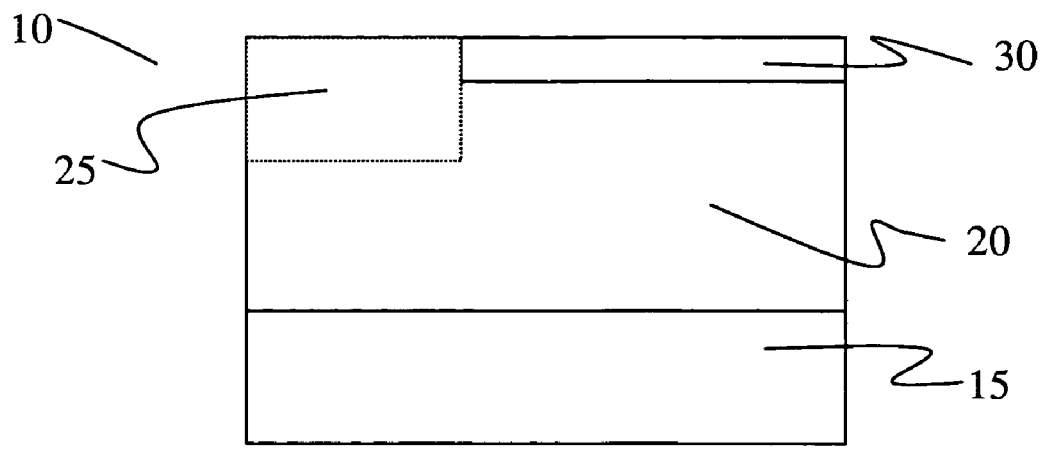
FIG. 1A. A schematic side view depiction of an optical platform according to the instant invention.
Figure 1B:
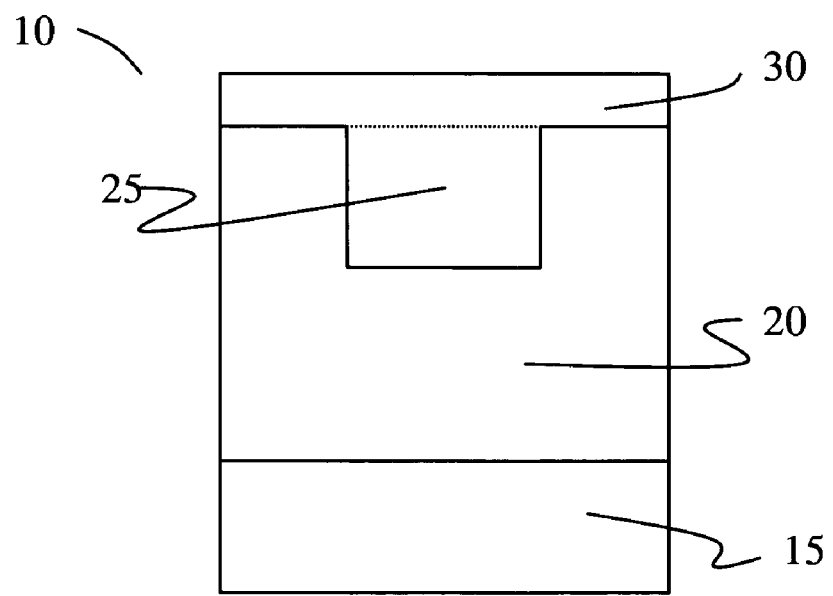
FIG. 1B. A schematic end view depiction of an optical platform according to the instant invention.

This invention addresses the problem of improving the efficiency of transfer between an optical fiber and planar or layered optical device structures. The instant invention provides an opto-photonic platform for integrated photonic devices. The platform includes a photonic circuit and a surrounding optical bench that facilitates the interconnection of an optical fiber with the photonic circuit. In a preferred embodiment, the platform is monolithic and includes a planar photonic circuit region adjacent to an optical bench that includes a trench for receiving and seating an optical fiber. FIGS. 1A and 1B show a schematic depiction of an opto-photonic platform according to the instant invention in side view and end view, respectively. The platform 10 includes a substrate 15, optical bench 20 that includes a trench region 25, and a photonic circuit 30. The trench region 25 is included to facilitate the connection of the platform 10 with an external optical fiber.

The photonic circuit 30 is located upon the surface of optical bench 20 and includes one or more surface films that are adapted to the control of the direction, intensity, confinement, wavelength and/or mode characteristics of an optical signal. The photonic circuit may include one or more active and/or passive optical devices. The optical devices may include a waveguide and/or a photonic crystal. The photonic crystal may include a point or linear defect. The photonic crystal may be a rod-type photonic crystal (periodically arranged regions of a higher dielectric constant material surrounded by a lower dielectric constant material) or a hole-type photonic crystal ((periodically arranged regions of a lower dielectric constant material surrounded by a higher dielectric constant material). The photonic circuit may also include a switchable chalcogenide or phase change element whose optical properties (e.g. refractive index or absorption coefficient) can be reversibly transformed from one set of values to another set of values upon application of energy (e.g. optical energy or electrical energy).

Photonic devices that may be included in or interconnected within the photonic circuit and photonic coupling devices that may interconnected to the photonic devices include those described in U.S. Pat. No. 6,859,304 ('304 patent) granted to the instant assignee on Feb. 22, 2005, and entitled "Photonic Crystals and Devices Having Tunability and Switchability"; U.S. patent application Ser. No. 11/124,736 ('736 application) filed by the instant assignee on May 9, 2005, and entitled "Photonic Coupling Device" and U.S. patent application Ser. No. 10/855,482 ('482 application) filed by the instant assignee on May 27, 2004, and entitled "Optical Coupling Device"; the disclosures of which are hereby incorporated herein. Representative examples of devices or device combinations that may be included in the photonic circuit are depicted in FIGS. 2A-2C.

Figure 2A:
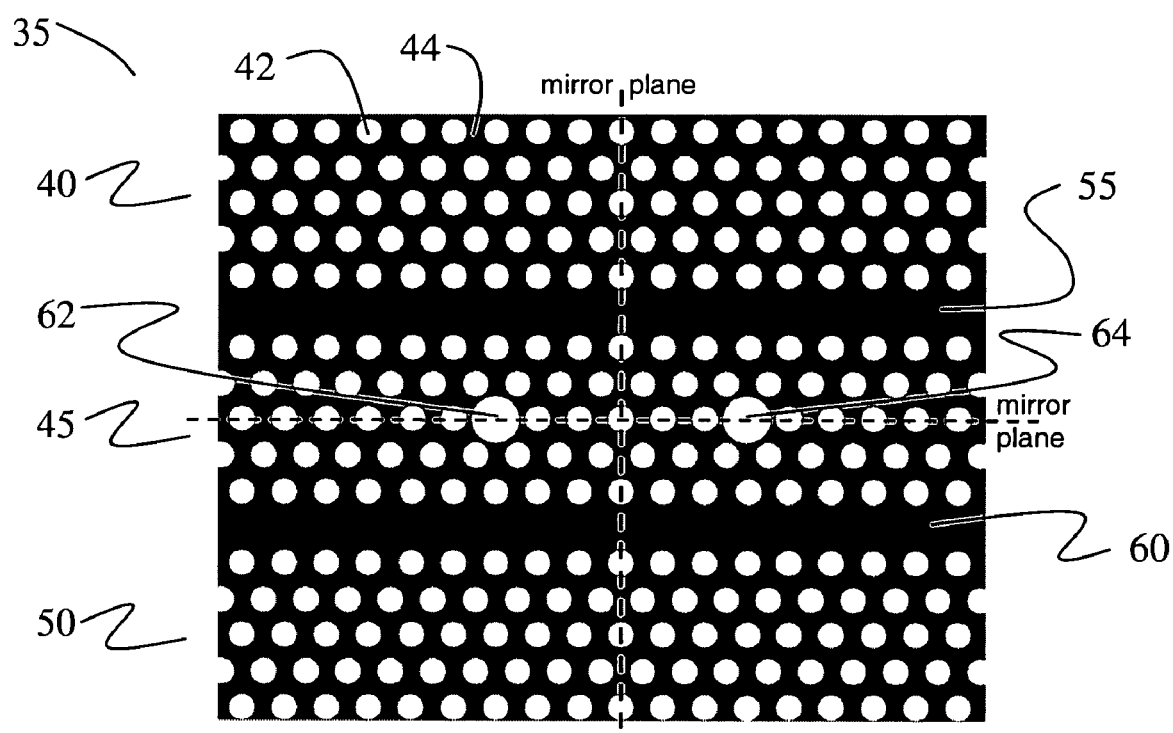
FIG. 2A. A photonic crystal having a resonator and two waveguides.

FIG. 2A presents an embodiment of a photonic crystal channel drop filter. The channel drop filter 35 includes upper photonic crystal region 40, middle photonic crystal region 45 and lower photonic crystal region 50 that are separated by photonic crystal waveguides 55 and 60. The waveguides may be referred to as the bus and drop waveguides. Each of the three photonic crystal regions is a hole photonic crystal that includes periodically arranged holes 42 positioned within a higher dielectric constant surrounding medium 44. Channel drop filter 35 is a dual monopole channel drop filter that includes two mirror planes of symmetry and cavity regions 62 and 64 that are enlarged. Cavity regions 62 and 64 are defects that function as resonators to permit the transfer of an optical signal from waveguide 55 to waveguide 60. The size of the resonators and the contrast of the dielectric constant of the resonator material and the surrounding dielectric material determine which wavelengths of an optical signal are capable of being transferred. The cavity region may also include balancing holes (not shown).

The photonic circuit of the instant invention may include a single, dual or multiple (three or more) monopole cavity configuration. The photonic circuit may include a photonic crystal (with or without a defect), a photonic crystal waveguide, slab waveguide, a cavity resonator, a channel drop filter, or any combination of two or more of the foregoing.

Figure 2B:
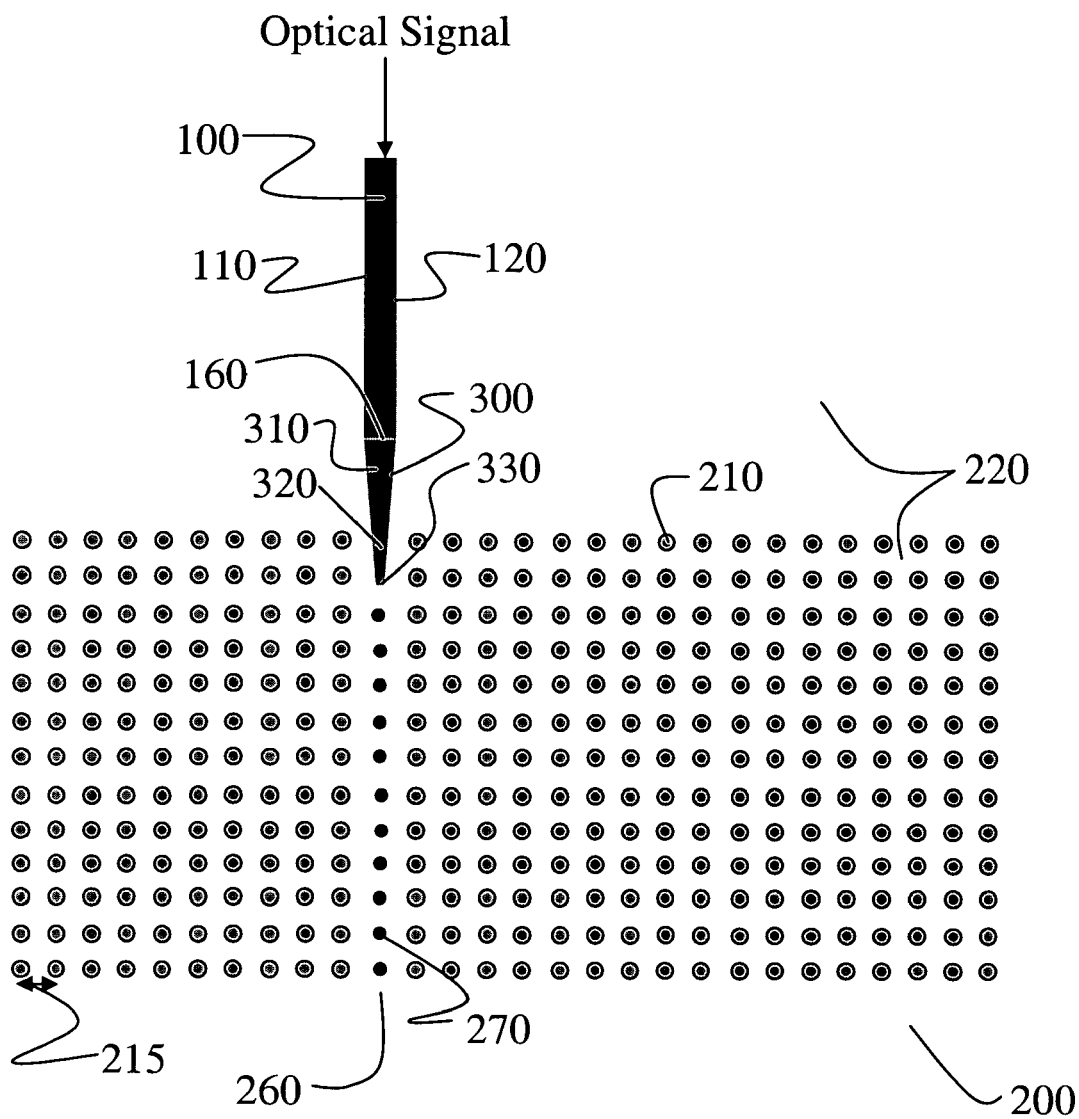
FIG. 2B. A photonic crystal interconnected to a photonic coupling device.
Figure 2C:
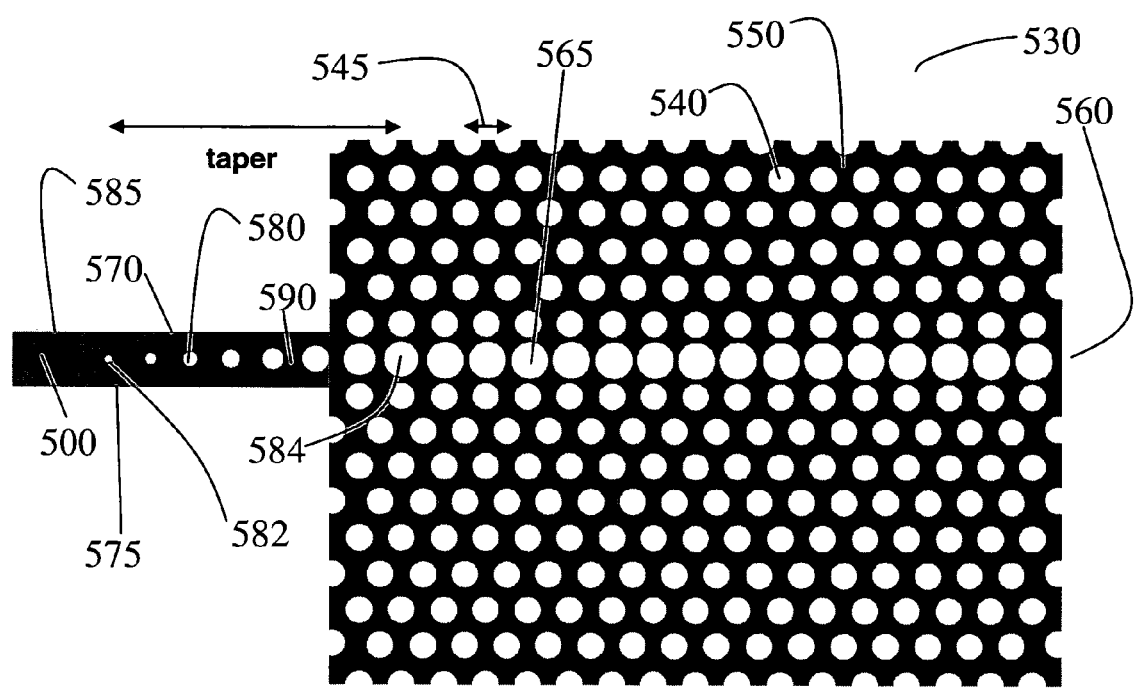
FIG. 2C. A photonic crystal interconnected to a photonic coupling device.

FIG. 2B presents is a top view depiction that shows the coupling of photonic wire 100 to photonic crystal 200 via photonic coupling device 300. An optical signal (single mode or multimode) propagating in photonic wire 100 is transferred to photonic crystal 200 through photonic coupling device 300. Photonic wire 100 may be viewed as a transmitting element interconnected to photonic coupling device 300 and photonic crystal 200 may be viewed as a receiving element interconnected to photonic coupling device 300.

A photonic crystal includes a periodic arrangement of macroscopic dielectric objects interspersed within a surrounding dielectric medium. In FIG. 2B, photonic crystal 200 includes periodically arranged dielectric objects in the form of rods 210 interspersed within a surrounding dielectric medium 220. The periodically arranged rods 210 and surrounding medium 220 are comprised of one or more dielectric materials, where the rods 210 have a higher refractive index than surrounding medium 220. As an example, rods 210 may comprise a dielectric material such as silicon, while the surrounding dielectric medium 220 may comprise air. The periodic spacing of the rods 215 corresponds to the distance between the centers of adjacent rods. As indicated hereinabove, the periodic spacing of a photonic crystal is a design parameter that can be varied to define the properties of the photonic band gap and establish the magnitude and range of wavelengths of electromagnetic radiation that are within and without the photonic band gap. The rod diameter is a fraction of the periodic spacing and is another design parameter. The rod height is another design parameter that can be controlled during fabrication. The rods of this example have a circular cross-section. Other embodiments include rods having other cross-sectional shapes including square, rectangular, hexagonal and triangular.

Representative dimensions for the photonic crystal of the embodiment of FIG. 2B are as follows: the periodic spacing 215 is 434 nm, the diameter of rods 210 is 191 nm, the diameter of defect rods 270 is 130 nm, the height of rods 210 and 270 is 781 nm and the height of photonic wire 100 is 781 nm.

Photonic crystal 200 further includes defect 260 that includes defect rods 270. Defect 260 is a linear defect obtained by reducing the diameter of a column of rods. The presence of defect rods 270 in the photonic crystal creates states within the photonic band gap that allow the photonic crystal to support optical signals having selected wavelengths. Optical signals having a wavelength compatible with the photonic band gap state created by the linear defect 260 can be transmitted along the defect and transmitted through the photonic crystal. Since the wavelength is otherwise within the photonic band gap, the optical signal is confined to the linear defect and is precluded by Bragg reflection at the boundaries of the defect from propagating to other parts of the photonic crystal. By varying the relative sizes of the defect rods 270 and normal (non-defect) rods 210, the wavelength supported by the defect state can be designed to match particular signals of interest. In the embodiment of FIG. 2B, defect rods 270 are comprised of the material used to form rods 210. In other embodiments, the defect rods may be comprised of a different material and may be larger in size than the normal rods.

The photonic wire 100 has a width in the plane of the top view of FIG. 2B that is no greater than the period spacing of rods in photonic crystal 200. The photonic wire 100 has planar sides 110 and 120 normal to the plane of the top view of FIG. 2B. In the embodiment shown in FIG. 2B, the height of the photonic wire 100 matches the height of the periodically arranged rods 210 and the photonic wire 100 is comprised of the material used to form rods 210. Photonic coupling device 300 includes non-embedded portion 310 and embedded portion 320, where the embedded portion 320 spatially overlaps a portion of photonic crystal 200.

FIG. 2C is a top view depiction that shows the coupling of photonic wire 500 to photonic crystal 530 via photonic coupling device 570. An optical signal (single mode or multimode) propagating in photonic wire 500 is transferred to photonic crystal 530 through photonic coupling device 570. Photonic wire 500 may be viewed as a transmitting element interconnected to photonic coupling device 570 and photonic crystal 530 may be viewed as a receiving element interconnected to photonic coupling device 570.

In this embodiment, photonic crystal 530 is a hole photonic crystal that includes periodically arranged holes 540 interspersed within a surrounding medium 550. The periodically arranged holes 540 and surrounding medium 550 are comprised of one or more dielectric materials, where the holes 540 have a lower refractive index than surrounding medium 550. The holes may contain air or may be filled with some other material. The periodic spacing of the holes 545 corresponds to the distance between the centers of adjacent holes. As indicated hereinabove, the periodic spacing of a photonic crystal is a design parameter that can be varied to define the properties of the photonic band gap and establish the magnitude and range of wavelengths of electromagnetic radiation that are within and without the photonic band gap. The hole diameter is a fraction of the periodic spacing and is another design parameter. The hole height is another design parameter that can be controlled during fabrication.

Representative dimensions for the photonic crystal of the embodiment of FIG. 2C are as follows: the periodic spacing 545 is 375 nm, the diameter of holes 540 is 225 nm, the diameter of defect holes 565 is 300 nm, the height of holes 540 and 565 is 225 nm and the height of photonic wire 500 is 225 nm.

Photonic crystal 530 further includes defect 560 that includes defect holes 565. Defect 560 is a linear defect obtained by increasing the diameter of a row of holes. The presence of defect holes 565 in the photonic crystal creates states within the photonic band gap that allow the photonic crystal to support optical signals having selected wavelengths. Optical signals having a wavelength compatible with the photonic band gap state created by the linear defect 560 can be transmitted along the defect and transmitted through the photonic crystal. Since the wavelength is otherwise within the photonic band gap, the optical signal is confined to the linear defect and is precluded by Bragg reflection at the boundaries of the defect from propagating to other parts of the photonic crystal. By varying the relative sizes of the defect holes 565 and normal (non-defect) holes 540, the wavelength supported by the defect state can be designed to match particular signals of interest.

The photonic wire 500 has a width in the plane of the top view of FIG. 2C that is no greater than about twice the period spacing of rods in photonic crystal 530. The photonic wire 500 has planar sides 575 and 585 normal to the plane of the top view of FIG. 2C. In the embodiment shown in FIG. 2C, the height of the photonic wire 500 matches the height of the photonic crystal 530.

Photonic coupling device 570 includes a series of holes 580 that are tapered in size. In the embodiment of FIG. 2C, the hole size increases in the direction of propagation of the optical signal. The variation in the size of the holes may be referred to herein as a taper in the size of the holes, hole taper or taper. The hole taper extends from its smallest hole 582 near the input end of the coupling device to its largest hole 584 embedded within photonic crystal 530. The hole taper thus includes a non-embedded portion and an embedded portion. The approximate extent of the hole taper is indicated by the arrow labeled "taper" in FIG. 2C. The largest hole of the hole taper matches or closely approximates the size of defect holes 565. The hole taper of the coupling device 570 thus provides a gradual transition in hole size up to the size of defect holes 565 and thus provides a gradual transition from the impedance and propagation environment of the optical signal in photonic wire 500 to those of defect 560 in photonic crystal 530. The small hole size at the input end of the coupling device facilitates efficient coupling of an optical signal from photonic wire 500 to the input end of the coupling device and the larger hole size at the output end of the coupling device facilitates efficient coupling of the optical signal from photonic coupling device to defect 560 of photonic crystal 530. The coupling device 570 also includes surrounding medium 590 that surrounds the holes 580. In the embodiment of FIG. 2C, surrounding medium 590 is comprised of the same material as photonic wire 500 and surrounding medium 550 of photonic crystal 530.

As indicated hereinabove, some embodiments of the instant optical platform may include an optical or photonic coupling device that interconnects a photonic circuit to the optical bench or other portions of an integrated optical element. In a preferred embodiment, the coupling device is designed to maintain or approximately maintain the impedance of an optical signal when it is transferred from an external element or an element within the optical bench to the photonic crystal. Because of differences in feature sizes, dimensions, and shapes, losses that accompany the transfer of an optical signal from, for example, an optical fiber (large cross-sectional dimensions and round cross-sectional area) to a photonic crystal (small cross-sectional area and rectangular cross-sectional area) can be significant. As described in the '482 and '736 applications, transfer losses can be minimized by using a coupling device that smoothly varies in shape and dielectric constant along its length (the direction of propagation of an optical signal) in such a way that impedance is maintained constant or approximately constant. The cross-sectional area and dielectric constant of the coupling device both influence the impedance encountered by an optical signal and can be simultaneously varied to preserve impedance. A variation in dielectric constant can be achieved, for example, with a coupling device comprised of two or more dielectric materials in which the relative proportions of the different dielectric materials varies in the direction of propagation of an optical signal (e.g. the cross-sectional areal fraction of the different dielectric varies in the direction of propagation). Representative coupling devices include those depicted and described in FIGS. 2B and 2C hereinabove. Other examples include the coupling devices described in the '482 and '736 applications, including a photonic wire and filamentary devices.

The optical bench of the instant optical platform is configured to facilitate the interconnection of external optical connections to an optical or photonic coupling device interconnected to a photonic circuit or directly to the photonic circuit. In a preferred embodiment, the external optical connection is an optical fiber. The configuration of the optical bench permits placement of an optical fiber in a position that maximizes the efficiency of transfer of an optical signal from the fiber to a coupling device or photonic circuit. Optimal placement of the optical fiber requires achieving optimal spatial overlap of the optical signal as it exits the fiber with the input or receiving end of a coupling device or photonic circuit and also requires proper alignment of the fiber with the coupling device or photonic circuit. In a preferred embodiment, the central axis of the fiber is aligned with the central axis of the coupling device or photonic circuit.

The optical bench of the instant optical platform includes a trench or depression adjacent to a coupling device or photonic circuit. The trench is of a size and shape suitable for placement of an optical fiber therein and performs the function of receiving and holding an optical fiber. In a preferred embodiment, the trench is rectangular in its cross-sectional shape. In another preferred embodiment, the optical fiber is securely affixed or anchored to the optical bench within the trench.

Figure 3:
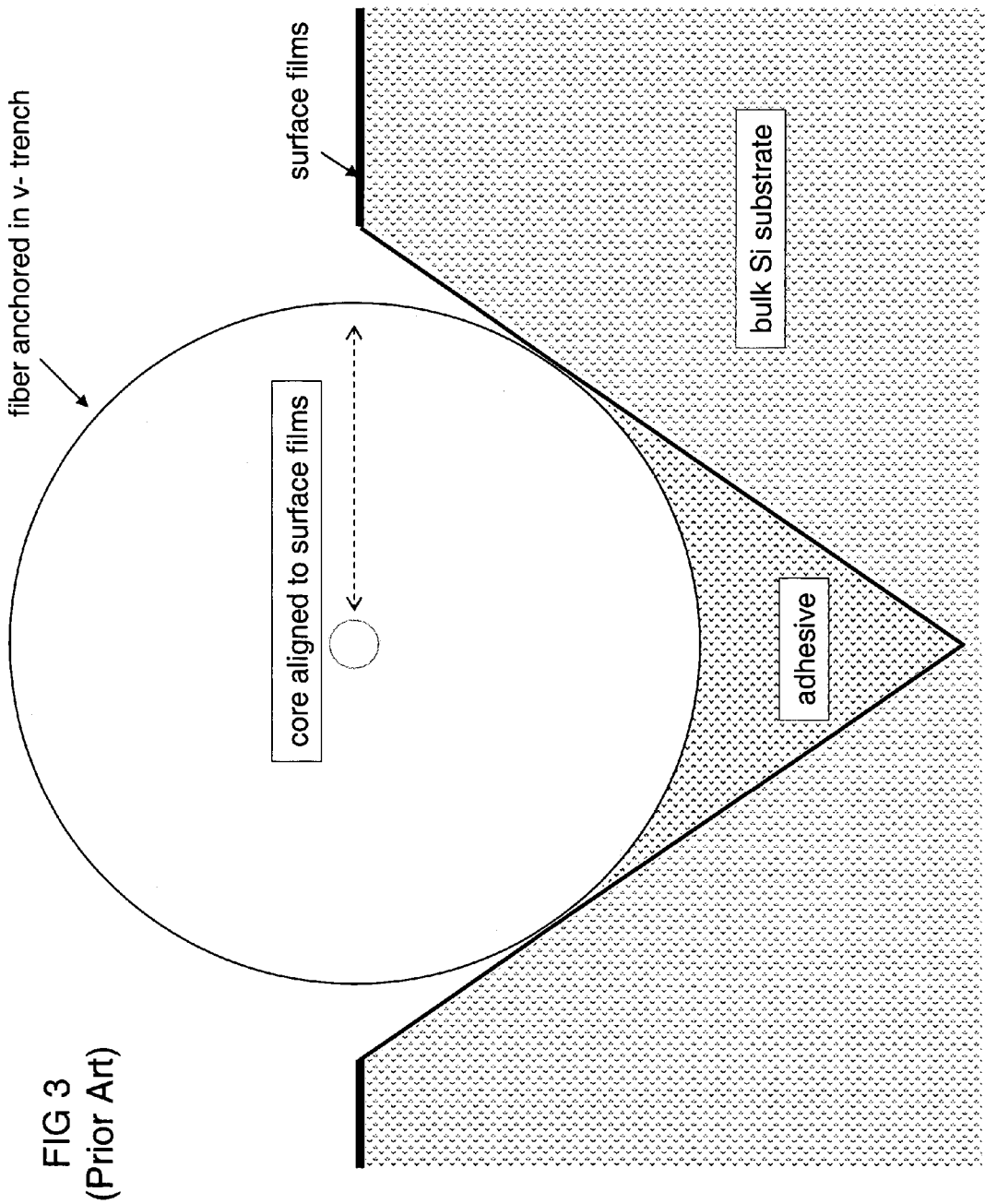
FIG. 3. A v-groove fiber alignment design.

The prior art teaches the use of v-grooves to anchor and align optical fibers to thin film optical devices in silicon. FIG. 3 shows a typical v-groove configuration from the prior art in cross-section. The v-groove is formed through an anisotropic etch of a bulk silicon substrate and provides an opening into which a fiber can be placed and aligned with thin film (surface) optical devices. The silicon substrate is masked at the surface to surround the region of the substrate that is etched to form the v-groove. The depth and width of the v-groove are established based on the diameter of the fiber that is seated in the v-groove. The objective is to insure that the core of the fiber is aligned with the surface films that include waveguides, other passive optical devices and active optical devices. The fiber is anchored to the v-groove with an adhesive. The adhesive lines the lower portion of the v-groove and the optical fiber is placed the adhesive to secure it. The surface films shown in FIG. 3 correspond to the photonic circuit and/or coupling device of the instant invention. In principle, the prior art v-groove approach provides near-perfect alignment of the optical fiber with the thin film surface features. The v-groove approach, however, suffers from two drawbacks. First, the area of contact between the fiber and the adhesive is oftentimes not sufficient to firmly secure the fiber to the v-groove. Second, because of limitations associated with the etching process, v-grooves can only be oriented along the (100) axes of the silicon wafer.

The rectangular trench included in the optical bench of the instant optical platform overcomes the limitations of the v-groove process. As described more fully herein below, a rectangular trench can be formed by using a silicon on insulator (SOI) substrate that includes a bonded silicon film supported by an $SiO_2$ bonding layer positioned on a base silicon wafer. By using a vertical reactive ion etch process, we can open a rectangular trench completely through the bonded silicon film using the $SiO_2$ layer at the bottom as both an etch stop and a level floor. The rectangular cross-section provides a more secure bed for the fiber and trenches can be run in any direction.

FIG. 4A shows a plan view of an optical platform according to the instant invention. The platform includes photonic circuit 130 formed within surface films 125 of a substrate. The surface films 125 are films deposited atop the substrate that are not part of the photonic circuit 130, but that facilitate the performance of photonic circuit 130. In a typical embodiment, the surface layers include a lower cladding layer (preferably an oxide, more preferably an oxide comprising silicon) positioned below the photonic circuit 133 and an upper cladding layer (preferably an oxide, more preferably an oxide comprising silicon) positioned above the photonic circuit 130. The cladding layers aid the performance of photonic circuit 130 by improving the confinement of light within photonic circuit 130. Films that facilitate the performance of the photonic circuit element of the instant invention may be referred to herein as surface films, chip surface films or the like. As described hereinabove, the photonic circuit includes one or more interconnected passive or active optical devices and may include, for example and without limitation, a waveguide, channel drop filter, resonator, and/or photonic crystal (with or without a defect). The embodiment of FIG. 4A further includes a coupling device 135 that interconnects photonic circuit 130 to optical fiber 145 located in the optical bench portion of the substrate. The coupling device 135 is a waveguide formed as a thin film on the substrate surface within or between chip surface films such as cladding layers. In other embodiments, the coupling device may be a photonic wire or impedance conserving device as described hereinabove. The optical fiber 145 is seated in rectangular trench 140 of the optical bench that has been formed through a vertical etch of the substrate. FIG. 4B presents a perspective view of optical fiber 145 that shows the placement of fiber core 155 relative to the chip surface upon which chip surface films 125 are deposited. The optical fiber 145 is positioned in trench 140 to a depth that permits alignment of fiber core 155 with photonic circuit 130, or a coupling device (e.g. waveguide 135) integrated to photonic circuit 130, included within the chip surface films.

Figure 5A:
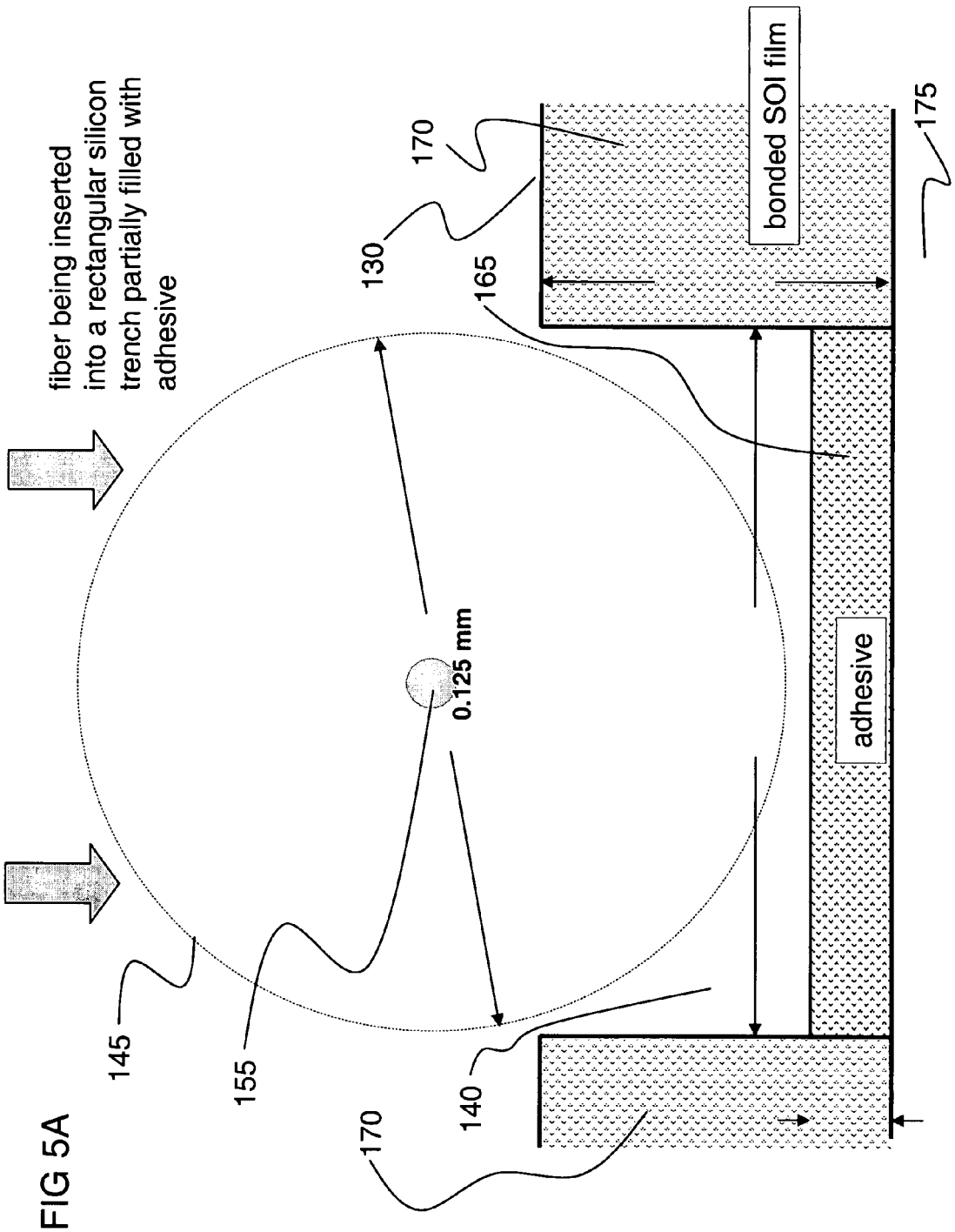
FIG. 5A. Cross-sectional view of fiber being inserted in a rectangular trench.
Figure 5B:
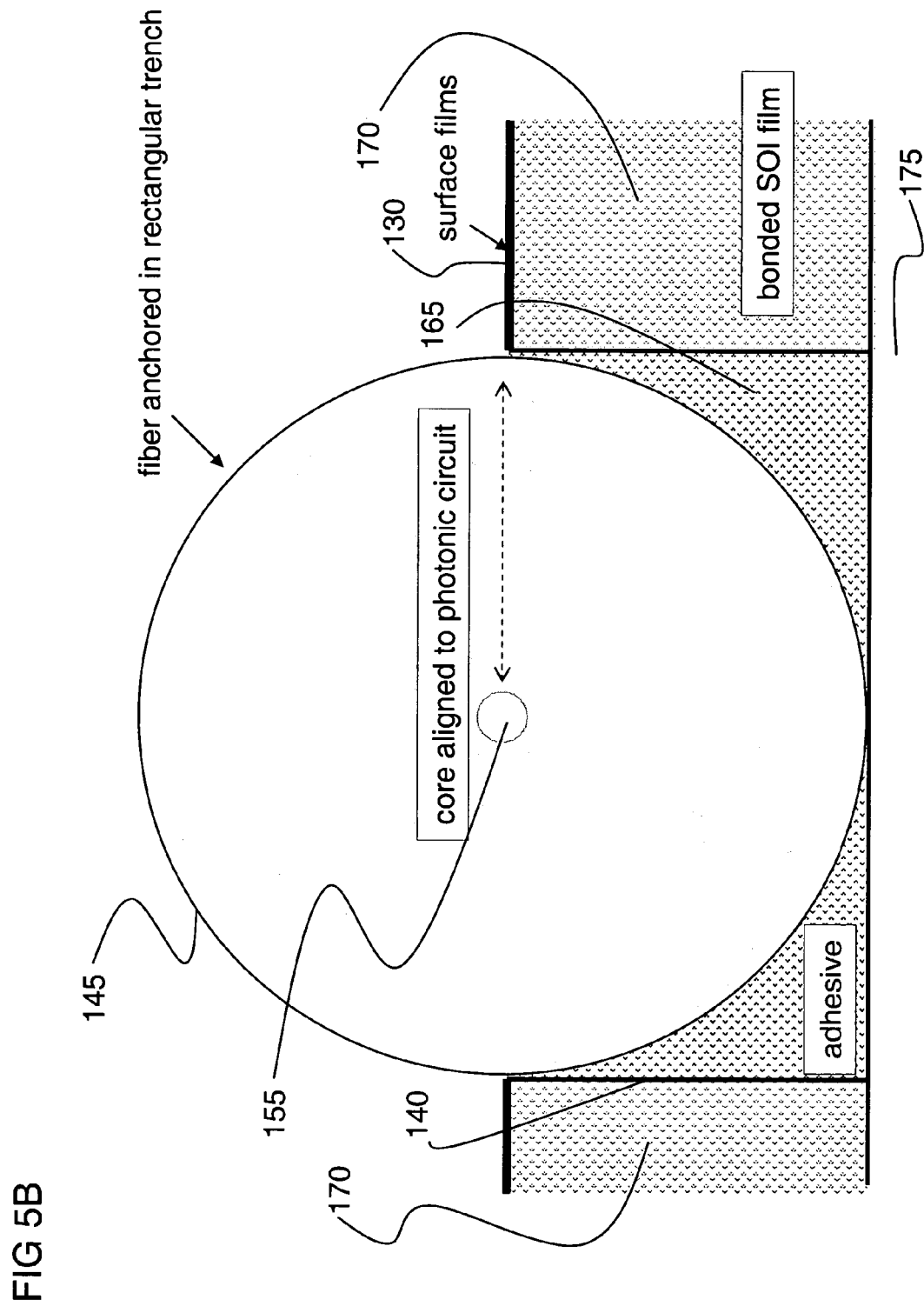
FIG. 5B. Fiber seated and adhered to a rectangular trench.
Figure 5C:
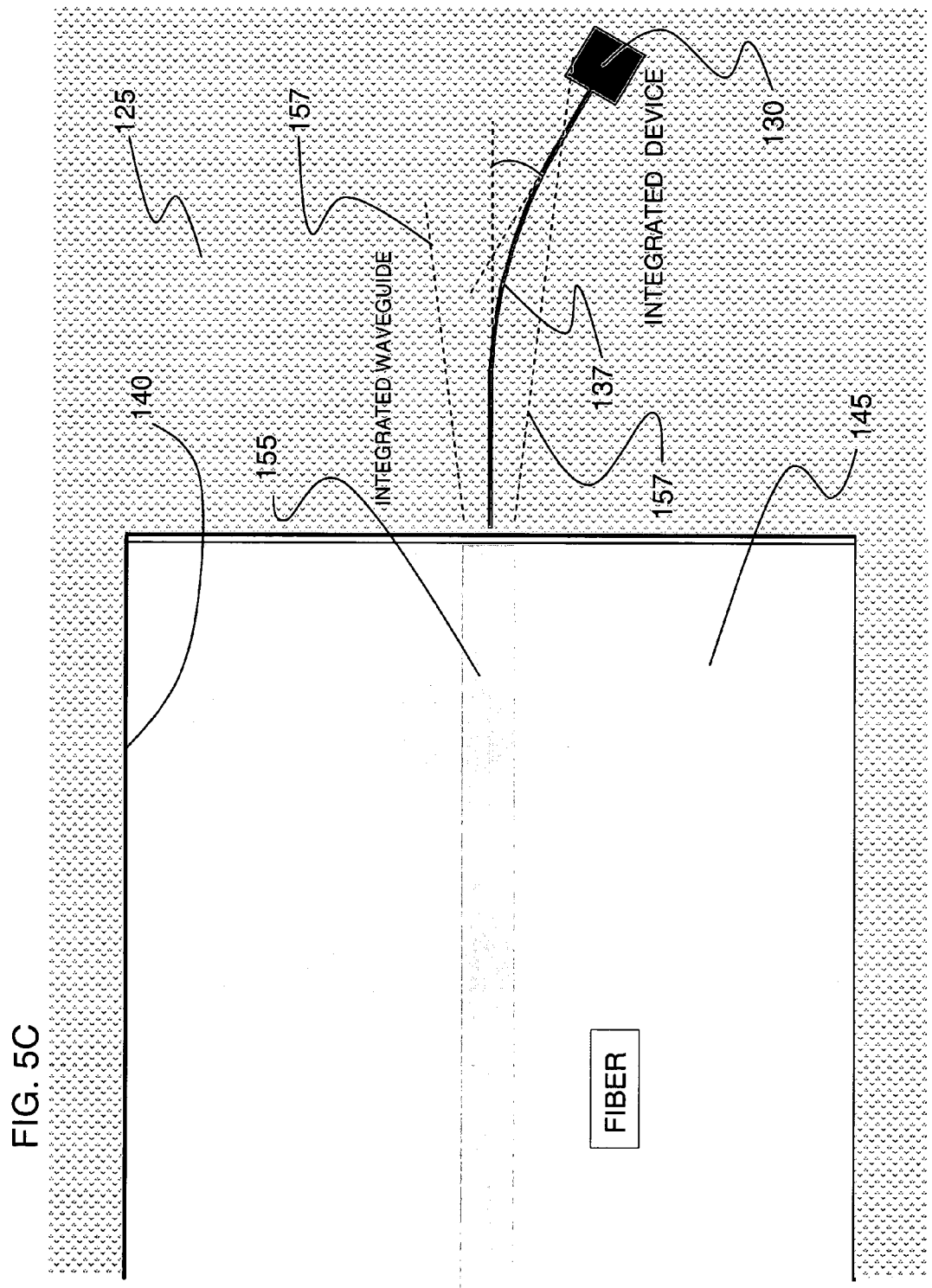
FIG. 5C. Embodiment illustrating a curved coupling device interconnecting an optical fiber and photonic circuit.

FIG. 5A presents a cross-sectional view of the optical fiber in the trench region of the optical bench and illustrates placement of the fiber in the trench. The optical bench includes trench 140 lined with adhesive 165 along its bottom surface and bonded silicon layer 170 situated on oxide layer 175 of the bonded silicon on insulator substrate. Oxide layer 175 is preferably a silicon oxide layer. Oxide layer 175 is situated upon a base substrate or wafer (not shown), which is preferably silicon. The width of trench 140 is at least as large as the diameter of optical fiber 145. The depth of trench 140 is equal to or approximately equal to the radius of optical fiber 145 and is selected so that fiber core 155 is aligned with photonic circuit 130 located within the chip surface films. FIG. 5B presents the cross-sectional view after the fiber has been seated and anchored in the trench. Optical fiber 145 rests at or near the bottom of trench 140. The anchored fiber displaces adhesive up along the vertical walls of trench 140, an effect that increases the surface area of contact between the fiber and the adhesive. This results in a more secure positioning of the fiber. FIG. 5C illustrates a top view perspective of an embodiment of the instant optical platform in which the coupling element is curved. The embodiment includes optical fiber 145 positioned in trench 140 so that the core 155 is aligned with the input or receiving end of coupling device 137 that interconnects the optical fiber 145 to photonic circuit 130 contained within surface films 125. The coupling device 137 includes a bend. The bend may be advantageous because it minimizes the extent to which stray light exiting optical fiber 145 interacts with photonic circuit 130. When light exits a fiber, it generally fans out in a cone and it may not be possible for coupling device 137 to fully capture that exiting light. The portion of the light exiting optical fiber 145 that is not coupled into coupling device 137 is stray light and may further propagate within surface films 125 and reach photonic circuit 130 by bypassing coupling device 137. Stray light that reaches photonic circuit 130 is a source of crosstalk that interferes with the processed output signal produced by the photonic circuit. Crosstalk is an undesirable source of noise that can cause inconsistencies or fluctuations in the signal produced by the photonic circuit. By including a bend within coupling device 137, photonic circuit 130 can be positioned away from the cone of light having boundaries 157 exiting optical fiber 145. As a result, crosstalk can be reduced or eliminated.

Figure 6B:
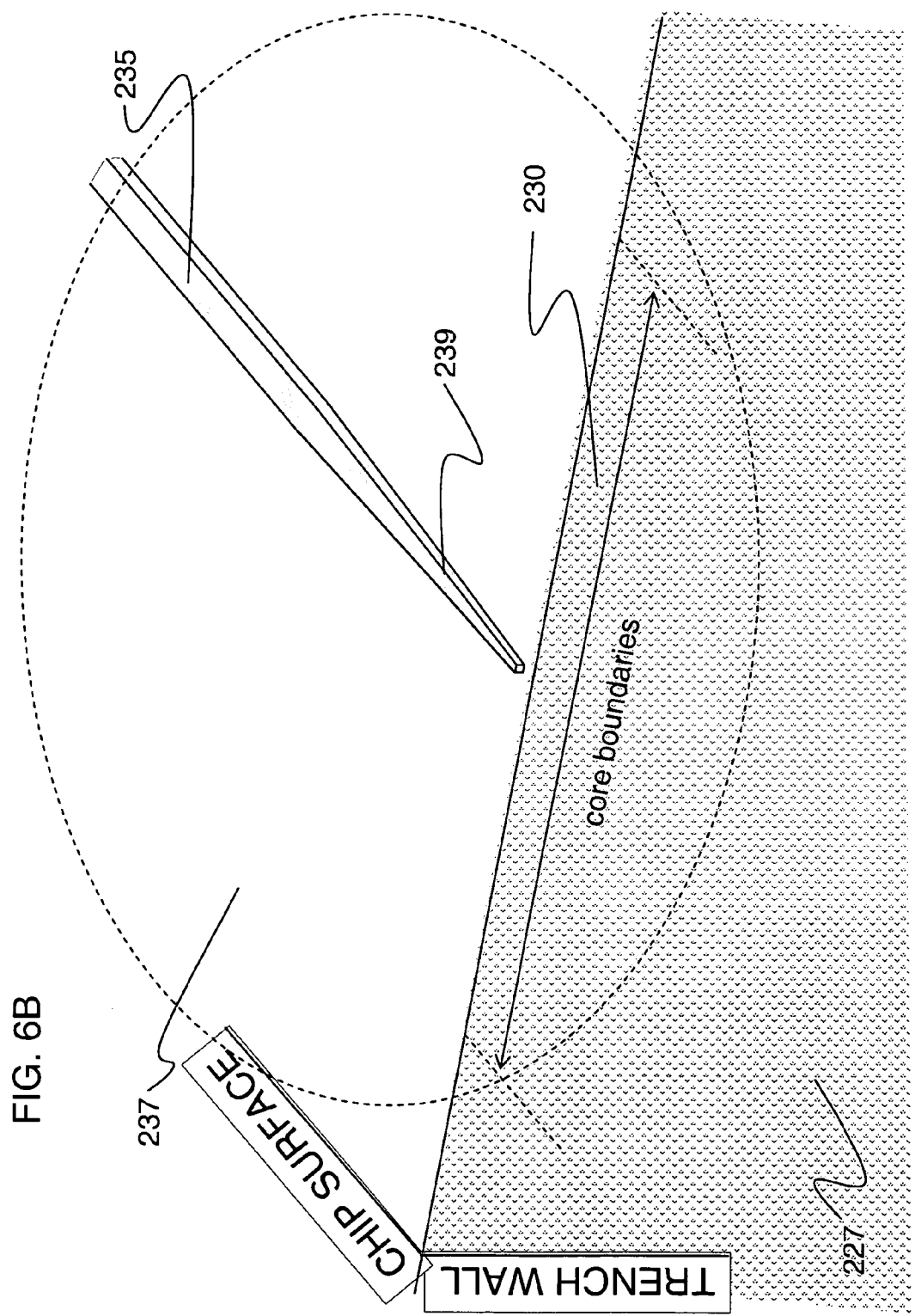
FIG. 6B. Enlargement of junction region showing a tapered coupling device.
Figure 6C:
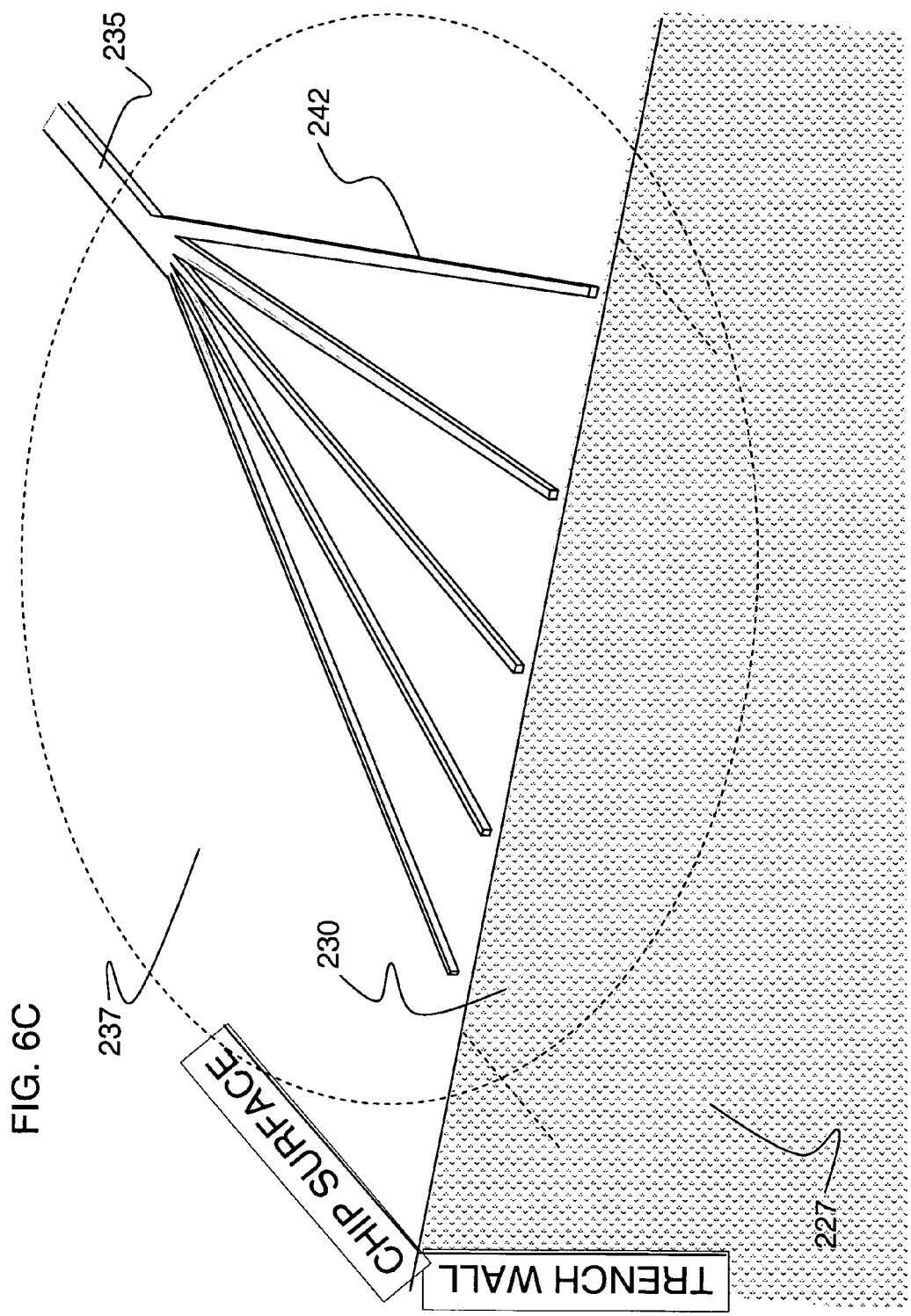
FIG. 6C. Enlargement of junction region showing a flared impedance matching coupling device.

FIG. 6A shows a perspective view of the junction region between an optical fiber and a coupling device for an embodiment of the instant optical platform. The perspective illustrates rectangular trench 225 (in which an optical fiber (not shown) is placed) and its junction with coupling device 235. The spatial overlap of core region 230 with coupling device 235 at the junction is schematically illustrated. In this embodiment, the coupling device is a waveguide or photonic wire included within surface films 240 deposited on the chip surface. An enlargement of the junction region is presented in FIG. 6B. Coupling device 235 is formed above chip surface 237 and contained within chip surface films (not shown). Vertical trench wall 227 and the core region 230 of the optical fiber are also depicted. In the embodiment of FIG. 6B, coupling device 235 includes a down taper region 239 that promotes better mode-matching at the junction than a truncated waveguide. An alternative embodiment of the junction region is presented in FIG. 6C. In FIG. 6C, the receiving end of coupling device 235 is flared and includes a series of protruding regions 242. The regions 242 approximately span a lateral distance that increases the spatial overlap with core region 230 of the optical fiber. The space between the regions 242 is occupied with the chip surface films (not shown) formed on chip surface 237. The flared design shown in FIG. 6C improves the efficiency of transfer of the optical signal from the core region 230 to coupling 235 by providing better impedance matching as described hereinabove. The regions 242 have a higher refractive index than the chip surface films and thus preferentially localize and confine the light exiting the optical fiber. The spatial area spanned by the regions 242 is large immediately adjacent to the fiber core and approximates the core diameter. The spatial area spanned by regions 242 tapers downward in the direction of the main waveguide portion of coupling device 235 to gradually vary the geometric cross-section of the optical signal so that it matches that the planar cross-section of coupling device 235.

FIG. 7 presents a top view of an embodiment of the photonic circuit portion of an optical platform according to the instant invention. The photonic circuit 400 includes regions 405 periodically arranged within a surrounding dielectric material 410, where the regions 405 have a lower dielectric constant (or refractive index) than dielectric material 410. In one embodiment, dielectric material 410 is silicon. In another embodiment, the dielectric material 410 is an alloy of silicon and germanium. The photonic circuit 400 is enveloped by chip surface films (e.g. cladding layers) that provide vertical confinement. The chip surface films have a lower dielectric constant (or refractive index) than dielectric material 410. In one embodiment, the chip surface films include the same material that forms regions 405. In this embodiment, a lower cladding layer of the chip surface films is first formed on the substrate and is followed by formation of a layer of dielectric material 410. Holes are next formed in a periodic pattern within dielectric material 410 by masking and etching and subsequently filled with a lower dielectric constant material to form regions 405. The material used to fill the holes may also then be used to form the upper cladding layer of the chip surface films. The lower cladding layer of the chip surface films may also be formed from the same material used to fill the holes. In other embodiments, the upper and lower cladding layers may be formed from a material different from the one used to fill the periodically arranged holes to form regions 405.

In the embodiment of FIG. 7 are shown four input and/or output ports that may be used to direct light into or receive light from the photonic circuit. In the embodiment of FIG. 7, the ports shown have the same design and only one will be described in detail herein. In other embodiments, the ports may have designs that differ from those in FIG. 7 and the various ports interconnected to the photonic circuit may have designs that differ from each other. A representative port is generally illustrated at 415. The port includes a coupling device 420 that may be a waveguide, photonic wire or other coupling device as described hereinabove. In a preferred embodiment, the coupling device is formed from the same lower dielectric material used to form regions 405. The coupling device 420 interconnects the photonic crystal 400 to the optical bench (not shown) of the instant optical platform. In a preferred embodiment, the optical bench includes an optical fiber seated in a rectangular trench as described hereinabove. In the embodiment of FIG. 7, the coupling device 420 includes a tapered portion 416 and defect pairs 417, 418 and 419 in the photonic crystal. Defects 417, 418 and 419 are perturbed in size relative to periodically arranged regions 405 and/or displaced in position from the regular lattice positions of periodically arranged regions 405. Defects 417, 418, and 419 are tapered in size with the size decreasing from 419 to 418 to 417 and ultimately merging with the size of regions 405. As described in the '736 application, inclusion of defects 417, 418 and 419 aids the matching of impedance of the transfer of an optical signal back and forth between the photonic crystal and coupling device. Tapered portion 416 similarly aids impedance matching and is preferably formed from the same lower dielectric material as the remaining portion of coupling device 420. The input port 415 further includes regions 422 and 424 from which surrounding dielectric material 410 has been etched or otherwise removed. Regions 422 and 424 are formed from a material having a lower dielectric constant than dielectric material 410. In a preferred embodiment, regions 422 and 424 are occupied by the same lower dielectric material used to form regions 405 and/or coupling device 420 and/or tapered region 416. As described in the '736 application, the presence of lower dielectric constant regions 422 and 424 in the vicinity of coupling device 420 reduces the loss of an optical signal propagating in coupling device 420 to the surroundings thus leading to better confinement within the coupling device.

Photonic circuit 400 further includes waveguides 430 and 435 formed in the photonic crystal. Photonic crystal waveguides 430 and 435 are formed by removing rows of the periodically arranged regions 405. The waveguides can be formed, for example, by masking the appropriate regions prior to performing the etching or other process used to form the holes that define periodically arranged regions 405. The photonic crystal waveguides confine light that is within the photonic band gap of the photonic crystal. If light within the photonic band gap is introduced into waveguide 430 or 435, the surrounding photonic crystal confines the light by preventing its propagation into the body of the photonic crystal. As illustrated in FIG. 7, the photonic crystal waveguides may be linear or bent. The photonic crystal of the embodiment of FIG. 7 further includes a dual cavity resonator similar to the one shown in FIG. 2A and described hereinabove. The resonator includes an enlargement of two of the periodically arranged regions to form cavity defects 432 and 434. The cavity defects create defect states within the photonic band gap and permit select wavelengths and/or directions of propagation within the photonic band gap to become stabilized in the central portion of the photonic crystal. The cavity defects permit optical signals having a suitable wavelength and/or direction of propagation to transfer out of either of the waveguides 430 and 435 into the resonator. Once stabilized in the resonator, the optical signal may be returned either to the waveguide from which it originated or the other waveguide and upon return, may be directed in the original direction of propagation or in another direction of propagation. The resonator can function as a channel drop filter and can be used to transfer an optical signal from any of the four ports shown in FIG. 7 to any of the other ports to provide control over the propagation of the optical signal and the information contained therein. The properties of channel drop filters are described in detail in the '304 patent.

FIG. 8A illustrates representative steps for the fabrication of the trench region of the optical bench of the instant optical platform. A bonded silicon on insulator substrate is used and is first masked to provide a pattern for etching the trenches. Step 1 in FIG. 8A shows the result after etching the trenches. The structure includes the undetached portion of the bonded silicon film 605 and insulating oxide layer (preferably a silicon oxide) 607 on a base silicon wafer 610. In step 2, a carbon film 615 is sputtered on the surface and lines the trenches. In step 3, a spin-on glass (SOG) coating 620 is deposited on the surface. In a preferred embodiment, the spin-on glass is a silicon oxide or siloxane-based glass formed through a spin-coating process followed by evaporation and/or subsequent thermal annealing. In a preferred embodiment, the spin-on glass is formed through the polymerization of a liquid phase precursor deposited on the surface. In step 4, the surface is planarized through a CMP process. In step 5, the exposed portions of carbon film 615 are removed. In step 6, chip surface layers (e.g. cladding layers) and the necessary layers for optical devices or the photonic circuit are deposited. These layers are collectively depicted at 625 in FIG. 8A. The chip surface and device layers are then masked in the region of the surface away from the trench and in step 7, the unmasked chip surface and device layers and the spin-on glass that fills the trench are removed with HF. The masking layers are then removed. This foregoing process provides rectangular or substantially rectangular trenches.

FIG. 8B illustrates a fabrication process for forming a photonic crystal. In step 1, a lower cladding layer 642 is first deposited onto a substrate 640. In a preferred embodiment, the substrate is bonded silicon on oxide substrate and the lower cladding layer is formed on the bonded silicon layer. The lower cladding layer may be $SiO_2$ or some other lower dielectric constant material. In addition to the lower cladding layer, other chip surface layers may also be formed in this step. After the lower cladding layer is deposited, a higher index layer 644 is deposited next. The higher index layer is a layer within the chip surface layers and forms part of a photonic crystal, waveguide, coupling device or other optical device. In a preferred embodiment, the higher index layer is a silicon germanium alloy such as $Ge_3Si$. In step 2, layer 644 is e-beam patterned and reactive ion etched to form holes 646. In one embodiment, the holes are patterned and periodically arranged in a regular triangular lattice array. Representative dimensions for the holes include a diameter of about 225 nm and a period spacing of about 375 nm. In step 3, the holes 646 are filled with a material having a lower dielectric constant than layer 644 and an upper cladding layer 648 (along with other chip surface layers) is deposited. The filled holes correspond to the periodically arranged regions of a photonic crystal. In a preferred embodiment, the holes 646 are filled with the material used to form lower cladding layer 642. In another preferred embodiment, the holes 646 are filled with the material used to form the upper cladding layer. In another embodiment, the lower and upper cladding layers are formed from the same lower dielectric material.

FIG. 8C illustrates a fabrication process for forming a photonic crystal in which at least some of the periodically arranged regions are formed by filling the holes with two materials. In step 1, a lower cladding layer 652 is first deposited onto a substrate 650. In a preferred embodiment, the substrate is bonded silicon on oxide substrate and the lower cladding layer is formed on the bonded silicon layer. The lower cladding layer may be $SiO_2$ or some other lower dielectric constant material. In addition to the lower cladding layer, other chip surface layers may also be formed in this step. After the lower cladding layer is deposited, a higher index layer 654 is deposited next. The higher index layer is a layer within the chip surface layers and forms part of a photonic crystal, waveguide, coupling device or other optical device. In a preferred embodiment, the higher index layer is a silicon germanium alloy such as $Ge_3Si$.

In step 2, layer 644 is patterned and etched to form depressions 656 and in step 3, the depressions are filled by depositing a layer 658 onto the surface and planarizing. The layer 658 is comprised of a material other than the higher dielectric constant material used to form layer 654. The layer 658 may have a higher or lower dielectric constant than layer 654. In one embodiment, the layer 658 is a chalcogenide material. In a more preferred embodiment, the chalcogenide material is a phase change material that can be reversibly transformed among a crystalline state, one or more partially crystalline states, and an amorphous state. In step 4, layer 654 is e-beam patterned and reactive ion etched to form holes 660. In one embodiment, the holes are patterned and periodically arranged in a regular triangular lattice array. Representative dimensions for the holes include a diameter of about 225 nm and a period spacing of about 375 nm. In step 5, the holes 660 are filled with a material having a lower dielectric constant than layer 654 and an upper cladding layer 664 (along with other chip surface layers) is deposited. The filled holes correspond to the periodically arranged regions of a photonic crystal. In a preferred embodiment, the holes 660 are filled with the material used to form lower cladding layer 652. In another preferred embodiment, the holes 660 are filled with the material used to form the upper cladding layer. In another embodiment, the lower and upper cladding layers are formed from the same lower dielectric material.

Figure 9A:
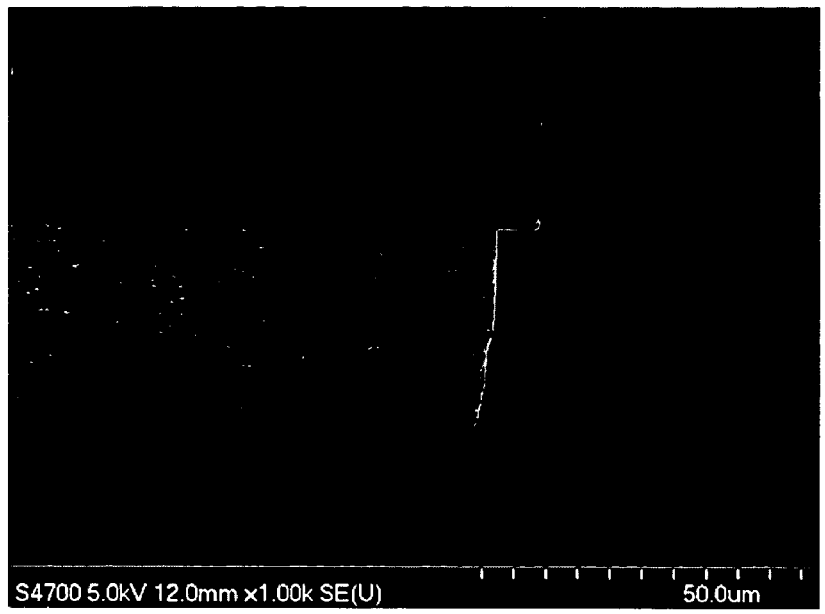
FIG. 9A. SEM micrograph of an undercut structure.
Figure 9B:
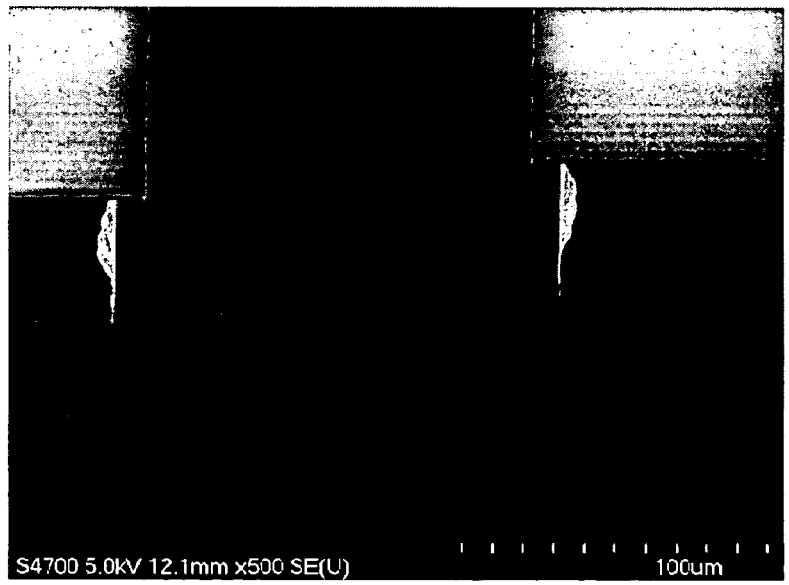
FIG. 9B. SEM micrograph of an undercut structure.

FIG. 8D illustrates the fabrication steps in another embodiment of the instant invention. The final stricture shown in FIG. 8D corresponds to a trench-undercut structure and is formed through the "trench-last" sequence of processing steps illustrated in FIG. 8D. In the trench-undercut structure, the chip surface layers (including the upper and lower cladding layers) and the layers included within the coupling device and/or the photonic circuit extend over a vertical trench wall and protrude into the trench region. In step 1, a silicon on insulator substrate having a base silicon substrate 680, oxide layer 682 and bonded silicon layer 684 is utilized. Chip surface and photonic coupling and/or photonic circuit layers 686 are deposited on bonded silicon layer 684 and masked with layers 688. In step 2, rectangular trenches are formed by etching as described in step 1 of the process depicted in FIG. 8A. The etching in this step occurs substantially in the vertical direction. In step 3, the bonded silicon layer 684 is further vapor-etched with $XeF_2$ or a similar etchant. This step has the effect of etching the vertical trench walls to remove a portion of the bonded silicon layer 684 beneath the chip surface and photonic circuit layers 686. FIGS. 9A and 9B show representative SEM micrographs of two examples of an undercut structure.

In a preferred embodiment, the protruding layers include portions of the lower cladding layer, upper cladding layer, layers comprising an optical or photonic coupling device and/or photonic circuit. The protruding layers extend into the trench and can be oriented to face the output end of an optical fiber positioned within the trench. The advantage of the undercut structure is that it creates a region of low dielectric material immediately beneath the receiving end of the protruding layers since a portion of the higher dielectric material has been removed. As a result, when light exits the fiber, it tends to preferentially localize in the protruding layers since they represent the highest dielectric constant region initially encountered by the emerging light. The layers of the photonic circuit or coupling device into which the optical signal is to propagate preferentially receive the light exiting the fiber and losses to the underlying bonded silicon layer are reduced. A low dielectric gap is formed between the output end of the fiber and the bonded silicon layer. The overall result is a greater efficiency of transfer from the optical fiber to the photonic circuit.

The disclosure and discussion set forth herein is illustrative and not intended to limit the practice of the instant invention. While there have been described what are believed to be the preferred embodiments of the instant invention, those skilled in the art will recognize that other and further changes and modifications may be made thereto without departing from the spirit of the invention, and it is intended to claim all such changes and modifications that fall within the full scope of the invention. It is the following claims, including all equivalents, in combination with the foregoing disclosure and knowledge commonly available to persons of skill in the art, which define the scope of the instant invention.

I claim:

1. An optical platform comprising:
    an optical bench and a photonic circuit, said optical bench including a trench and an optical fiber disposed in the trench, said trench formed within a silicon layer bonded to an insulating layer, said insulating layer defining a bottom surface and a depth of said trench, wherein said optical fiber is aligned with said photonic circuit, said photonic circuit includes a layer having a refractive index greater than the refractive index of the silicon layer; and
    cladding layers enveloping said photonic circuit.

2. The optical platform of claim 1, further comprising a coupling device, said coupling device interconnecting said optical fiber and said photonic circuit.

3. The optical platform of claim 2, wherein said coupling device is an impedance matching coupling device.

4. The optical platform of claim 3, wherein said impedance matching coupling device includes a flared plurality of tapered regions.

5. The optical platform of claim 3, wherein said impedance matching coupling device is tapered.

6. The optical platform of claim 3, wherein said impedance matching coupling device is flared.

7. The optical platform of claim 1, wherein a portion of said photonic circuit protrudes above said trench.

8. The optical platform of claim 1, wherein said photonic circuit includes a channel drop filter.

9. The optical platform of claim 8, wherein said channel drop filter comprises a switchable chalcogenide material.

10. The optical platform of claim 1, wherein said photonic circuit includes a three or more input ports.

11. The optical platform of claim 1, wherein said photonic circuit includes a photonic crystal.

12. The optical platform of claim 11, wherein said photonic crystal includes a defect.

13. The optical platform of claim 11, wherein said photonic crystal includes a plurality of periodically arranged regions.

14. The optical platform of claim 13, wherein at least one of said plurality of periodically arranged regions includes a phase change material configured to be reversibly transformed between a crystalline state, a partially crystalline state, and an amorphous state.

15. The optical platform of claim 11, wherein said photonic crystal includes a silicon germanium alloy.

16. The optical platform of claim 15, wherein said photonic crystal includes a plurality of periodically arranged regions.

17. The optical platform of claim 16, wherein at least one of said plurality of periodically arranged regions includes a phase change material configured to be reversibly transformed between a crystalline state, a partially crystalline state, and an amorphous state.

18. The optical platform of claim 1, wherein an axis of said optical fiber is aligned with said photonic circuit.

19. The optical platform of claim 1, further comprising an adhesive disposed within said trench and contacting approximately one-half a cross-sectional circumference of said optical fiber.

20. The optical platform of claim 1, wherein said photonic circuit includes a silicon germanium alloy.

21. The optical platform of claim 1, wherein a photonic coupling device, optically coupled to said optical fiber, extends from said optical fiber in a direction away from stray light propagating from said optical fiber.

22. A method of forming an optical platform comprising the steps of:
bonding a silicon layer to an insulating layer;
forming a trench in a portion of said silicon layer;
filling said trench with a dielectric material;
planarizing the surface of said dielectric material;
forming a photonic circuit on said planarized surface;
masking a portion of said photonic circuit disposed above said trench;
etching the portion of said photonic circuit disposed above said trench and etching said dielectric material in said trench simultaneously, wherein said insulating layer defines a bottom surface and a depth of said trench such that an optical fiber thereafter disposed in said trench is aligned with said photonic circuit, and the portion of the photonic circuit masked above said trench remains after etching 23. The method of claim 22, wherein said insulating layer includes an oxide layer interposed between a said bonded silicon layer and a base silicon substrate.

24. The method of claim 23, wherein said photonic circuit is formed on said bonded silicon layer.

25. The method of claim 22, wherein said photonic circuit includes a photonic crystal aligned with said optical fiber.

26. The method of claim 25, wherein the step of forming said photonic circuit includes forming a cladding layer that envelops said photonic crystal.

27. The method of claim 25, wherein said photonic crystal includes a silicon germanium alloy.

28. The method of claim 27, further comprising forming a plurality of periodically arranged regions in said photonic crystal.

29. The method of claim 28, wherein at least one of said regions includes a phase change material configured to be reversibly transformed between a crystalline state, a partially crystalline state, and an amorphous state.

* * * * *